US012172474B2

(12) United States Patent
Pellacani et al.

(10) Patent No.: US 12,172,474 B2
(45) Date of Patent: Dec. 24, 2024

(54) TIRE CHANGER APPARATUS

(71) Applicant: Vehicle Service Group Italy S.R.L., Ostellato (IT)

(72) Inventors: Gianfranco Pellacani, Correggio (IT); Gianni Rabitti, Carpi (IT); Mario Artioli, Campagnola Emilia (IT); Stefano Casaletti, Novellara (IT)

(73) Assignee: Vehicle Service Group Italy S.R.L., Ostellato (IT)

( * ) Notice: Subject to any disclaimer, the term of this patent is extended or adjusted under 35 U.S.C. 154(b) by 370 days.

(21) Appl. No.: 17/692,616

(22) Filed: Mar. 11, 2022

(65) Prior Publication Data

US 2022/0288980 A1 Sep. 15, 2022

(30) Foreign Application Priority Data

Mar. 12, 2021 (IT) .......................... 102021000005828

(51) Int. Cl.
*B60C 25/138* (2006.01)
*B60C 25/05* (2006.01)

(52) U.S. Cl.
CPC ........ *B60C 25/138* (2013.01); *B60C 25/0572* (2013.01)

(58) Field of Classification Search
CPC .............. B60C 25/0563; B60C 25/059; B60C 25/0593; B60C 25/132; B60C 25/135; B60C 25/138
See application file for complete search history.

(56) References Cited

U.S. PATENT DOCUMENTS

| | | | |
|---|---|---|---|
| 3,958,618 | A | 5/1976 | Reuther |
| 5,226,465 | A | 7/1993 | Schön et al. |
| 6,182,736 | B1 | 2/2001 | Cunningham et al. |
| 6,422,285 | B1 * | 7/2002 | Gonzaga ............... B60C 25/132 157/1.24 |
| 8,387,675 | B1 | 3/2013 | Vaninger et al. |
| 9,073,394 | B1 | 7/2015 | Clasquin et al. |

(Continued)

FOREIGN PATENT DOCUMENTS

| | | |
|---|---|---|
| CN | 107856482 | 3/2018 |
| CN | 207523371 | 6/2018 |

(Continued)

OTHER PUBLICATIONS

Thanbichler, Italian Search Report for Italian patent application No. IT202000002920, Sep. 17, 2020, 8 pages.

(Continued)

*Primary Examiner* — David B. Thomas
(74) *Attorney, Agent, or Firm* — Fish & Richardson P.C.

(57) ABSTRACT

A tire changer apparatus includes: a base, a wheel-holder configured to rotate a wheel around a rotation axis, a first and second column emerging from the base, a first device having an extensible arm carrying a tool, a second device having a respective extensible arm carrying a tool opposite the tool of the first device with respect to an ideal middle plane of the apparatus. The tire changer apparatus further includes: a first and a second bar respectively connecting the arms of the first and second devices, a transmission which connects the first and the second bar to synchronize the movement of the arms of the first and second devices.

21 Claims, 12 Drawing Sheets

(56) References Cited

U.S. PATENT DOCUMENTS

| | | | |
|---|---|---|---|
| 9,227,473 B2* | 1/2016 | Sotgiu | B60C 25/138 |
| 9,434,219 B1* | 9/2016 | Clasquin | B60C 25/02 |
| 2015/0298514 A1* | 10/2015 | Nicolini | B60C 25/138 |
| | | | 157/1.24 |
| 2019/0152279 A1 | 5/2019 | Jiang | |
| 2021/0252925 A1 | 8/2021 | Gonzaga et al. | |

FOREIGN PATENT DOCUMENTS

| | | |
|---|---|---|
| CN | 110126558 | 8/2019 |
| CN | 110126558 A | 8/2019 |
| CN | 210652559 | 6/2020 |
| EP | 0243785 | 11/1987 |
| EP | 0659597 | 6/1995 |
| EP | 1040941 A2 | 10/2000 |
| EP | 1157860 A2 | 11/2001 |
| EP | 1916125 A1 | 4/2008 |
| EP | 1584495 | 5/2008 |
| EP | 1897710 | 3/2009 |
| EP | 2103457 | 9/2009 |
| EP | 2444260 | 3/2013 |
| IT | MO20110126 | 11/2012 |
| JP | 2010234984 A | 10/2010 |
| WO | WO2014020395 A1 | 2/2014 |
| WO | WO2014129476 A1 | 10/2021 |

OTHER PUBLICATIONS

Thanbichler, Italian Search Report for Italian Patent Application No. IT102021000005828, Nov. 3, 2021, 23 pages.

* cited by examiner

TIRE CHANGER APPARATUS

CLAIM OF PRIORITY

This application claims priority under 35 USC § 119(a) to Italian Patent Application No. 102021000005828, filed on Mar. 12, 2021, the entire contents of which is hereby incorporated by reference.

TECHNICAL FIELD

The disclosure relates to a tire changer apparatus and a mounting/demounting process of tires on/from wheels of vehicles. The present invention may be used in the automobile field for mounting and/or dismounting tires from rims of vehicles, including cars, trucks, vans, farm vehicles or motorcycles.

BACKGROUND

Known tire changer apparatuses comprise a base and a wheel-holder emerging from the base. The wheel holder is adapted to put a wheel in rotation around an axis; such apparatuses have a frame emerging from the base and carrying upper and lower bead pressing tools allowing, during dismounting, separation of the bead from the rim and, during mounting, insertion of the bead between the edges of the rim. Tire changer apparatuses may also comprise a mount/demount tool carried by the frame and configured for being radially interposed between the bead of the tire and the edge of the rim to allow lifting of the bead and partial engagement or disengagement of the latter with/from the edge of the rim.

Although known tire changers are used, they are nevertheless susceptible of improvements.

SUMMARY

An object of the invention is to provide a tire changer apparatus having a simple and compact structure, which has limited production costs but at the same time is structurally strong, capable of effectively executing the operations of mounting and dismounting of a tire from a rim of a wheel. Another object of the present invention is to provide a tire changer apparatus extremely flexible in use, capable of ensuring the effective and quick mounting-dismounting of a vast range of tires with different diameter and width. Another object of the present invention is to provide a safe tire changer apparatus capable of mounting-dismounting a tire from a rim without damaging the latter or tools of the apparatus itself.

This and other objects, which will be clearer from the following description, are substantially reached by a tire changer apparatus and by a mounting and dismounting process in accordance with one or more of the enclosed claims and/or of the following aspects.

SUMMARY

One aspect of the invention concerns a tire changer apparatus (1) for mounting and/or dismounting of a tire (P) from a rim of a wheel of a vehicle, said tire changer apparatus (1) comprising:
a base (2),
a wheel-holder (3) engaged with the base (2) and configured to put in rotation around a rotation axis (Z) at least one wheel of a vehicle,
a frame (4) comprising at least one first and second column (4a, 4b) emerging from the base along a direction substantially parallel to the rotation axis (Z),
at least one first device (5) comprising:
  an arm (7) carried by the first column (4a), wherein said arm (7) of the first device (5) extends between a front portion (7a) directed towards the rotation axis (Z) and an opposite rear portion (7b), wherein said arm (7) of the first device (5) is configured to move at least said front portion (7a) relative to the wheel-holder (3) to vary a distance between said front portion (7a) of the arm (7) of the first device (5) and the rotation axis (Z),
  a tool (8) terminally carried by the arm (7) at the front portion (7a) and configured to operate on at least one of a rim and a tire of a wheel carried by the wheel-holder (3),
a second device (6) comprising:
  an arm (70) carried by the second column (4b), wherein said arm (70) of the second device (6) extends between a front portion (70a) directed towards the rotation axis (Z) and an opposite rear portion (70b), wherein said arm (70) of the second device (6) is configured to move at least said front portion (70a) relative to the wheel-holder (3) to vary a distance between said front portion (70a) of the arm (70) of the second device (6) and the rotation axis (Z),
  a tool (80) terminally carried by the arm (70) at the front portion (70a) and configured to operate on at least one of a rim and a tire of a wheel carried by the wheel-holder (3).

In one aspect according to the preceding aspect the first and second column (4a, 4b) are opposite each other. In one aspect according to any one of the preceding aspects the first and second column (4a, 4b) are opposite each other with respect to an ideal middle plane (P) of the tire changer apparatus (1). In one aspect according to the preceding aspect the ideal middle plane is parallel to the rotation axis (Z). In one aspect according to the preceding aspect the tool (80) of the second device (6) is opposite to the tool (8) of the first device (5) with respect to the ideal middle plane (P). In one aspect according to the preceding aspect the tire changer apparatus comprises:
a first bar (41) configured to rotate around an axis (Y') substantially parallel to the rotation axis (Z), said first bar (41) being connected at least with the front portion of the arm (7) of the first device (5),
a second bar (42) configured to rotate around a respective axis (Y") substantially parallel to the rotation axis (Z), said second bar (42) being connected at least to the front portion of the arm (70) of the second device (6).

In one aspect according to the preceding aspect the tire changer apparatus comprises a transmission (60) which connects the first and the second bar (41, 42) to synchronize the movement of the front portions (7a, 70a) of the first and second devices (5, 6).

In one aspect according to any one of the preceding aspects at least said front portion (7a) of the arm (7) of the first device (5) is connected at least with the front portion (70a) of the arm (70) of the second device (6). In one aspect according to the preceding aspect the tire changer apparatus is configured to move, in a synchronized manner, at least the front portions (7a, 70a) of the arms (7, 70) of the first and second devices (5, 6) relative to the wheel-holder (3) to vary a distance between said front portions (7a, 70a) and the rotation axis (Z).

In one aspect according to any one of the preceding aspects, the tire changer apparatus comprises a transmission (60) configured to connect at least the front portions (7a, 70a) of the arms (7, 70) of the first and second devices (5, 6). In one aspect according to any one of the preceding aspect the transmission is configured to connect at least the front portions (7a, 70a) of the arms (7, 70) of the first and second devices (5, 6) to allow the synchronous movement of said portions relative to the wheel-holder (3) to vary a distance between said front portions (7a, 70a) and the rotation axis (Z).

In one aspect according to any one of the preceding aspects, the arms (7, 70) of the first and second devices are of extensible type. In one aspect according to the preceding aspect the transmission (60) is configured to connect the arms (7, 70) of the first and second devices (5, 6) of extensible type such that a movement of the arm (7) of the first device (5) corresponds with a movement of the arm (70) of the second device (6). In one aspect according to any one of the preceding aspects the rotation axis (Y') of the first bar (41) is substantially parallel to the rotation axis (Y") of the second bar (42). In one aspect according to any one of the preceding aspects the first bar (41) is placed at the first column (4a). In one aspect according to any one of the preceding aspects the second bar (42) is placed at the second column (4b). In one aspect according to any one of the preceding aspects the first bar (41) is opposite the second bar (42) with respect to the ideal middle plane (P).

In one aspect according to any one of the preceding aspects the frame (4) extends between a bottom portion (40a) placed at the base (2) and a top portion (40b) opposite the bottom portion (40a), wherein the first bar (41) extends substantially over the entire extension of the frame (4). In one aspect according to the preceding aspect the first bar (41) extends between a first and a second end portion (41a, 41b), wherein the first end portion (41a) of the first bar (41) is substantially arranged at the bottom portion (40a) of the frame (4) while the second end portion (41b) of said first bar (41) is placed at the top portion (40b) of the frame (4). In one aspect according to any one of the preceding aspects the second bar (42) extends substantially over the entire extension of the frame (4). In one aspect according to the preceding aspect the second bar (42) extends between a respective first and a second end portion (42a, 42b), wherein the first end portion (42a) of the second bar (42) is substantially arranged at the bottom portion (40a) of the frame (4) while the second end portion (42b) of said second bar (42) is placed at the top portion (40b) of the frame (4). In one aspect according to any one of the preceding aspects the transmission (60) is arranged in proximity of at least one of the bottom portion (40a) and the top portion (40b) of the frame (4). In one aspect according to any one of the preceding aspects, the transmission (60) is engaged with the first and second bars (41, 42):

at the first end portions (41a, 42a) of said first and second bars (41, 42), and/or at the second end portions (41b, 42b) of said first and second bars (41, 42).

In one aspect according to any one of the preceding aspects the first bar (41) has a section having polygonal shape, optionally hexagonal shape. In one aspect according to any one of the preceding aspects the first bar (41) has a constant section over the entire extension thereof between the first and the second end portion (41a, 41b). In one aspect according to any one of the preceding aspects the second bar (42) has a section having polygonal shape, optionally hexagonal shape. In one aspect according to any one of the preceding aspects the second bar (42) has a constant section over the entire extension thereof between the first and the second end portion (42a, 42b).

In one aspect according to any one of the preceding aspects the transmission (60) is configured to synchronize the movement of the front portions (7a, 70a) of the first and second devices (5, 6) such that the distance present between the tool (8) of the first device (5) and the rotation axis (Z) is substantially identical to a distance present between said rotation axis (Z) and the tool (80) of the second device (6).

In one aspect according to any one of the preceding aspects the transmission (60) comprises:

a first transmission member (43) fit on the first bar (41), a second transmission member (44) fit on the second bar (42), a drive element (49) connecting said first and second transmission members (43, 44).

In one aspect according to the preceding aspect the first transmission member (43) comprises at least one selected from the group of: a toothed wheel, a crown, a friction wheel, a pulley. In one aspect according to the two preceding aspects the second transmission member (44) comprises at least one selected from the group of: a toothed wheel, a crown, a friction wheel, a pulley. In one aspect according to the three preceding aspects the drive element (49) comprises at least one selected from the group of: a toothed wheel, a friction wheel, a chain, a belt, a rope. In one aspect according to any one of the preceding aspects the drive element (49) comprises at least one of a chain, a belt, a rope. In one aspect according to any one of the preceding aspects the transmission (60) comprises an adjuster (47) placed in contact with the drive element (49) and in interposition between the first and second transmission members (43, 44), said adjuster (47) being relatively movable in proximity of at least one of said first and second transmission members (43, 44) to allow a tensioning adjustment of the drive element (49).

In one aspect according to any one of the preceding aspects the frame (4) comprises, at the top portion (40b), a support plate (40c) which engages the transmission (60). In one aspect according to the preceding aspect, the transmission (60) is opposite the first and second devices (5, 6) with respect to the support plate (40c) of the frame (4).

In one aspect according to any one of the preceding aspects the arm (7) of the first device (5) is movable towards and away from the rotation axis (Z) to move the tool (8) of said first device (5) at least between a retreated position and an advanced position. In one aspect according to the preceding aspect, the tool (8) of the first device (5), in the retreated position, has a distance from the rotation axis (Z) greater than a distance present between said rotation axis (Z) and said tool (8) of the first device (5) when arranged in the advanced position. In one aspect according to the preceding aspect the tool (8) of the first device (5), in the retreated position, has a distance from the ideal middle plane (P) greater than a distance present between said ideal middle plane (P) and said tool (8) of the first device (5) when arranged in the advanced position. In one aspect according to the preceding aspect the tool (8) of the first device (5), in the retreated position, has a distance from the ideal middle plane (P) substantially comprised between 80 mm and 300 mm, optionally between 100 mm and 200 mm. In one aspect according to the two preceding aspects the tool (8) of the first device (5), in the advanced position, has a distance from the ideal middle plane (P) substantially comprised between 30 mm and 200 mm, optionally between 50 mm and 100 mm.

In one aspect according to any one of the preceding aspects the arm (7) of the first device (5) extends along an extension direction lying on a plane substantially orthogonal to the rotation axis (Z), wherein the extension direction of the arm (7) of the first device (5) is tilted with respect to the ideal middle plane (P). In one aspect according to the preceding aspect the extension direction of the arm (7) of the first device is tilted with respect to the ideal middle plane by an angle comprised between 10° and 30°, still more optionally comprised between 15° and 25°. In one aspect according to the preceding aspect the tilt of the arm (7) of the first device (5) is fixed with respect to the ideal middle plane (P). In one aspect according to any one of the preceding aspects the extension direction of the arm (7) of the first device (5) is substantially rectilinear. In a further aspect in accordance with any one of the preceding aspects, the extension direction of the arm (7) of the first device (5) is placed substantially in intersection with the rotation axis (Z) of the wheel.

In one aspect according to any one of the preceding aspects the arm (70) of the second device (6) is movable towards and away from the rotation axis (Z) to move the tool (80) of said second device (6) at least between a retreated position and an advanced position. In one aspect according to the preceding aspect the tool (80) of the second device (6), in the retreated position, has a distance from the rotation axis (Z) greater than a distance present between said rotation axis (Z) and said tool (80) of the second device (6) when arranged in the advanced position. In one aspect according to the preceding aspect the tool (80) of the second device (6), in the retreated position, has a distance from the ideal middle plane (P) greater than a distance present between said ideal middle plane (P) and said tool (80) of the second device (6) when arranged in the advanced position. In one aspect according to the preceding aspect the tool (80) of the second device (6), in the retreated position, has a distance from the ideal middle plane (P) substantially comprised between 80 mm and 300 mm, optionally between 100 mm and 250 mm. In one aspect according to the two preceding aspects the tool (80) of the second device (6), in the advanced position, has a distance from the ideal middle plane (P) substantially comprised between 30 mm and 200 mm, optionally between 50 mm and 100 mm. In one aspect according to the three preceding aspects the tool (80) of the second device (6), in the advanced position, has a distance from the rotation axis (Z) substantially identical to a distance present between said rotation axis (Z) and the tool (8) of the first device when arranged in the respective advanced position. In one aspect according to the three preceding aspects the tool (80) of the second device (6), in the retreated position, has a distance from the rotation axis (Z) substantially identical to a distance present between said rotation axis (Z) and the tool (8) of the first device when arranged in the respective retreated position.

In one aspect according to any one of the preceding aspects the arm (70) of the second device (6) extends along a predetermined extension direction lying on a plane substantially orthogonal to the rotation axis (Z), wherein the extension direction of the arm (70) of the second device (6) is tilted with respect to the ideal middle plane (P). In one aspect according to the preceding aspect the extension direction of the arm (70) of the second device (6) is tilted with respect to the ideal middle plane by an angle comprised between 10° and 30°, still more optionally comprised between 15° and 25°. In one aspect according to the preceding aspect the tilt of the arm (70) of the second device (6) is fixed with respect to the ideal middle plane (P). In one aspect according to any one of the preceding aspects the extension direction of the arm (70) of the second device (6) is substantially rectilinear. In a further aspect in accordance with any one of the preceding aspects the extension direction of the arm (70) of the second device (6) is placed substantially in intersection with the rotation axis (Z) of the wheel. In one aspect according to any one of the preceding aspects the tilt angle of the extension direction of the arm (7) of the first device (5) with respect to the ideal middle plane (P) is substantially identical to the tilt angle of the extension direction of the arm (70) of the second device (6) with respect to said ideal middle plane (P).

In one aspect according to any one of the preceding aspects the arm (7) of the first device (5) comprises:
  a sleeve (13) having a seat,
  a stem (14) slidably engaged within the seat of the sleeve (13), wherein the stem (14) defines the rear portion (7b) and the front portion (7a) of said arm (7) of the first device (5), wherein the tool (8) of the first device (5) is carried by said stem (14).

In one aspect according to the preceding aspect the first bar (41) is connected with the stem (14) of the arm (7) of the first device (5) such that a rotation of said first bar (41) corresponds with movement of said stem (14). In one aspect according to the two preceding aspects the tire changer apparatus (1) comprises a first wheel (15) fit on the first bar (41) and integral in rotation with the latter, wherein said first wheel (15) is configured to connect the first bar (41) with the stem (14) of the arm (7) of the first device (5).

In one aspect according to the preceding aspect the first wheel (15) comprises a double pulley, wherein the apparatus also comprises:
  an elongated first traction member (15a) engaged, at one end, with the front portion (7a) defined by the stem (14) of the arm (7) of the first device (5) and, at an opposite end, is engaged within a first seat of the double pulley, said first traction member (15a) being configured to be wound around the pulley according to a first winding sense,
  an elongated second traction member (15b) engaged, at one end, with the rear portion (7b) defined by the stem (14) of the arm (7) of the first device (5) and, at an opposite end, is engaged within a second seat of the double pulley, said second traction member (15b) being configured to be wound around the pulley according to a second winding sense opposite the first winding sense.

In one aspect according to the preceding aspect the arm (7) of the first device (5), following a movement of the stem (14) adapted to carry the front portion (7a) of said arm towards the rotation axis (Z), rotates the first wheel (15) by a driving action of the first traction member (15a). In one aspect according to the preceding aspect the arm (7) of the first device (5), following a movement of the stem (14) adapted to carry the front portion (7a) of said arm away from the rotation axis (Z), rotates the first wheel (15) by a driving action of the second traction member (15b). In one aspect according to the three preceding aspects the first traction member (15a) engaged directly with the arm (7) of the first device (5) comprises at least one of: a chain, a rope, a belt. In one aspect according to the four preceding aspects the second traction member (15b) directly engaged with the arm (7) of the first device (5) comprises at least one of: a chain, a rope, a belt. In one aspect according to any one of the preceding aspects the stem (14) and the sleeve (13) of the first device (5) are engaged with each other by a sliding block constraint.

In one aspect according to any one of the preceding aspects the arm (70) of the second device (6) comprises:
- a sleeve (23) having a seat,
- a stem (24) slidably engaged within the seat of said sleeve (23), wherein the stem (24) of the second device (6) defines the rear portion (70b) and the front portion (70a) of said arm (70) of the second device (6), wherein the tool (80) of the second device (6) is carried by said stem (24) of the same second device (6).

In one aspect according to the preceding aspect the second bar (42) is connected with the stem (24) of the arm (70) of the second device (6) such that a rotation of said second bar (42) corresponds with movement of said stem (24) of the same second device (6). In one aspect according to the two preceding aspects the tire changer apparatus (1) comprises a second wheel (25) fit on the second bar (42) and integral in rotation with the latter, wherein said second wheel (25) is configured to connect the second bar (42) with the stem (24) of the arm (70) of the second device (6).

In one aspect according to the preceding aspect the second wheel (25) comprises a double pulley, wherein the apparatus also comprises:
- a respective elongated first traction member (25a) engaged, at one end, with the front portion (70a) defined by the stem (24) of the arm (70) of the second device (6) and, at an opposite end, is engaged within a first seat of the double pulley, said first traction member (25a) being configured to be wound around said pulley according to a first winding sense,
- a respective elongated second traction member (25b) engaged, at one end, with the rear portion (70b) defined by the stem (24) of the arm (70) of the second device (6) and, at an opposite end, is engaged within a second seat of the double pulley, said second traction member (25b) being configured to be wound around said pulley according to a second winding sense opposite the first winding sense.

In one aspect according to the preceding aspect the arm (70) of the second device (6), following a movement of the stem (24) of the second device (6) adapted to carry the front portion (70a) of said arm (70) towards the rotation axis (Z), is configured to rotate said second wheel (25) by a driving action of the respective first traction member (25a). In one aspect according to the preceding aspect the arm (70) of the second device (6), following a movement of the stem (24) of the second device (6) adapted to carry the front portion (70a) of said arm (70) away from the rotation axis (Z), is configured to rotate said second wheel (25) by a driving action of the respective second traction member (25b). In one aspect according to the three preceding aspects the first traction member (25a) engaged directly with the arm (70) of the second device (6) comprises at least one of: a chain, a rope, a belt. In one aspect according to the four preceding aspects the second traction member (25b) engaged with the arm (70) of the second device (6) comprises at least one of: a chain, a rope, a belt.

In one aspect according to any one of the preceding aspects the first bar (41) is placed at the side of the sleeve (13) of the arm (7) of the first device (5). In one aspect according to the preceding aspect the first device (5) is interposed between the first bar (41) and the ideal middle plane (P).

In one aspect according to any one of the preceding aspects the second bar (42) is placed at the side of the sleeve (23) of the arm (70) of the second device (6). In one aspect according to the preceding aspect the second device (6) is interposed between the second bar (42) and the ideal middle plane (P).

In one aspect according to any one of the preceding aspects the tire changer apparatus (1) comprises a translation actuator (31) active on at least one stem (14, 24) of the first and second devices (5, 6) to allow the movement of said stem towards or away from the rotation axis (Z). In one aspect according to the preceding aspect the tire changer apparatus comprises a single translation actuator (31) directly active on the stem (24) of the second device (6) to move, via sliding, said stem (24) within the seat of the sleeve (23) of said second device (6). In one aspect according to the two preceding aspects the translation actuator comprises at least one of: a cylinder tire, a hydraulic cylinder, an electric motor.

In one aspect according to any one of the preceding aspects the stem (24) and the sleeve (23) of the second device (6) are engaged with each other by a constraint of sliding block type. In one aspect according to any one of the preceding aspects the first device (5) is movable relative to the frame (4) along a direction substantially parallel to the rotation axis (Z). In one aspect according to any one of the preceding aspects the second device (6) is movable relative to the frame (4) along a direction substantially parallel to the rotation axis (Z).

In one aspect according to any one of the preceding aspects the first column (4a) comprises a guide (11) extended parallel to the rotation axis (Z) of the wheel. In one aspect according to any one of the preceding aspects the guide (11) of the first column (4a) comprises a flat track, lying on a plane tilted with respect to the ideal middle plane (P). In one aspect according to the two preceding aspects the guide (11) of the first column (4a), optionally the flat track, extends on the side of the first bar (41) parallel to the latter. In one aspect according to the preceding aspect the guide (11) of the first column (4a) is interposed between the ideal middle plane (P) and the first bar (41). In one aspect in accordance with the three preceding aspects the first device (5) comprises a carriage (5a) slidably movable along said guide (11) of the first column (4a) along a direction parallel to the rotation axis (Z). In one aspect according to the preceding aspect the carriage (5a) of the first device (5) stably carries the arm (7) of the first device (5) itself. In one aspect according to the preceding aspect the carriage (5a) of the first device (5) is fixed to the sleeve (13) of the first device (5) itself. In one aspect according to any one of the preceding four aspects the guide (11) of the first column (4a) and the carriage (5a) of the first device (5) are engaged with each other by a constraint of sliding block type. In one aspect according to the preceding five aspects the carriage (5a) of the first device (5) is movable along said guide (11) of the first column (4a) towards and away from the base (2).

In one aspect according to any one of the preceding aspects the second column (4b) comprises a guide (12) extended parallel to the rotation axis (Z) of the wheel. In one aspect according to any one of the preceding aspects the guide (12) of the second column comprises a flat track, lying on a plane tilted with respect to the ideal middle plane (P). In one aspect according to the two preceding aspects the guide (12) of the second column (4b), optionally the flat track, extends on the side of the second bar (42) parallel to the latter. In one aspect according to the preceding aspect the guide (12) of the second column (4b) is interposed between the ideal middle plane (P) and the second bar (42). In one aspect in accordance with the three preceding aspects the second device (6) comprises a carriage (6a) slidably movable along said guide (12) of the second column (4b) along a direction parallel to the rotation axis (Z). In one aspect according to the preceding aspect the carriage (6a) of the second device (6) stably carries the arm (70) of the second device (6) itself. In one aspect according to the preceding aspect the carriage (6a) of the second device (6) is fixed to the sleeve (23) of the second device (6) itself. In one aspect according to any one of the preceding four aspects the guide (12) of the second column (4b) and the carriage (6a) of the second device (6) are engaged with each other by a constraint of sliding block type.

In one aspect according to the preceding five aspects the carriage (6a) of the second device (6) is movable along said guide (12) of the second column (4b) towards and away from the base (2). In one aspect according to any one of the preceding aspects the guides (11, 12) of the first and second column (4a, 4b) are arranged symmetrically with respect to the ideal middle plane (P). In one aspect according to any one of the preceding aspects the first device (5) is movable via sliding along the guide (11) of the first column (4a) independent of the relative movement via sliding of the second device (6) along the guide (12) of the second column (4b).

In one aspect according to any one of the preceding aspects the tire changer apparatus (1) comprises a lifting actuator active on at least one of said first and second devices (5, 6), said lifting actuator being configured to move at least one of said first and second devices (5, 6) relative to the base (2) along a direction substantially parallel to the rotation axis (Z) of the wheel.

In one aspect according to any one of the preceding aspects the lifting actuator comprises a first and a second lifting actuator (21a, 21b), separate and respectively active in an independent manner on the first and second devices (5, 6). In a further aspect in accordance with any one of the preceding aspects the first lifting actuator (21a) is configured to move the first device (5) along the guide (11) of the first column (4a) towards and away from the base (2). In a further aspect in accordance with any one of the preceding aspects the second lifting actuator (21b) is configured to move the second device (6) along the guide (12) of the second column (4b) towards and away from the base (2).

In one aspect according to any one of the preceding aspects the wheel mountable on the wheel-holder (3) is of the type comprising:
a rim comprising a hub allowing the rim to be mounted on the vehicle, the rim further includes a first and second opposite perimeter edges configured to engage a tire,
a tire comprising:
a first bead configured to be engaged with the first perimeter edge of the rim,
a second bead configured to be engaged with the second perimeter edge of the rim,
a tread configured to define defining, in use, the contact element of the tire with the asphalt
a first sidewall which connects the first bead to the tread,
a second sidewall which connects the second bead to the tread.

In one aspect according to any one of the preceding aspects the tool (8) of the first device (5) comprises a mount-dismount tool configured to be radially interposed between the first perimeter edge of the rim and the first bead of the tire to engage-disengage said first bead with/from the first perimeter edge of the rim.

In one aspect according to any one of the preceding aspects the tool (80) of the second device (6) comprises a bead breaker tool configured to act thrustingly on the first bead of the tire to allow a partial separation (or a complete separation) of said first bead from the first perimeter edge of the rim. In one aspect according to the preceding aspect the bead breaker tool comprises a rotary body configured to define, with the tire, a friction of rolling type, the rotary body being configured to rotate around an axis thereof in an operative condition in which the wheel rotates around the rotation axis (Z) and the rotary body contacts the tire. In one aspect according to the preceding aspect the rotary body comprises at least one selected of: a disc, a cylinder, a sphere.

In one aspect according to any one of the preceding aspects the tire changer apparatus (1) comprises a third device (90) comprising:
an arm (91) carried by the second column (4b), said arm (91) of the third device (90) extends between a front portion (91a) directed towards the rotation axis (Z) and an opposite rear portion (91b), wherein said arm (91) of the third device (90) is configured to move at least said front portion (91a) relative to the wheel-holder (3) to vary a distance between said front portion (91a) of the arm (91) of the third device (90) and the rotation axis (Z),
a tool (92) terminally carried by the arm (91) of said third device (90) at the front portion (91a) and configured to operate on a rim and/or a tire of a wheel carried by the wheel-holder (3).

In one aspect according to the preceding aspect the third device (90) is opposite the tool (8) of the first device (5) with respect to the ideal middle plane (P) of the tire changer apparatus (1). In one aspect according to the two preceding aspects the third device (90) is aligned with the second device (6) according to a direction parallel to the rotation axis (Z). In one aspect according to the three preceding aspects the third device (90), in use, is arranged below the second device (6). In one aspect according to any one of the preceding aspects the arm (91) of the third device (90) is connected in movement with the second bar (42). In one aspect according to the preceding aspect the second bar (42) rotates around the respective axis (Y") to move at least the front portion (91a) of the arm of the third device (90) relative to the wheel-holder (3). In one aspect according to any one of the preceding aspects the transmission (60) is configured to synchronize the movement of the front portions (7a, 70a, 91a) of the first, second and third device (5, 6, 90) such that the distances present between the tools (8, 80, 92) of said devices (5, 6, 90) and the rotation axis (Z) are substantially identical to each other. In one aspect according to any one of the preceding aspects the arm (91) of the third device (90) is movable towards and away from the rotation axis (Z) to move the tool (92) of said third device (90) at least between a retreated position and an advanced position. In one aspect according to the preceding aspect the tool (92) of the third device (90), in the retreated position, has a distance from the rotation axis (Z) greater than a distance present between said rotation axis (Z) and said tool (92) of the third device (90) when arranged in the advanced position. In one aspect according to the preceding aspect the tool (92) of the third device (90), in the retreated position, has a distance from the ideal middle plane (P) greater than a distance present between said ideal middle plane (P) and said tool (92) of the third device (90) when arranged in the advanced position.

In one aspect according to the preceding aspect the tool (92) of the third device (90), in the retreated position, has a distance from the ideal middle plane (P) substantially comprised between 80 mm and 300 mm, optionally between 100 mm and 250 mm. In one aspect according to the two preceding aspects the tool (92) of the third device (90), in the advanced position, has a distance from the ideal middle plane (P) substantially comprised between 30 mm and 200 mm, optionally between 50 mm and 100 mm. In one aspect according to the three preceding aspects, the tool (92) of the third device (90), in the advanced position, has a distance from the rotation axis (Z) substantially identical to a distance present between said rotation axis (Z) and the tool (80) of the second device (6) when arranged in the respective advanced position. In one aspect according to the three preceding aspects the tool (92) of the third device (90), in the retreated position, has a distance from the rotation axis (Z) substantially identical to a distance present between said rotation axis (Z) and the tool (80) of the second device (6) when arranged in the respective retreated position. In one aspect according to any one of the preceding aspects the arm (92) of the third device (90) extends along a predetermined extension direction lying on a plane substantially orthogonal to the rotation axis (Z), wherein the extension direction of the arm (91) of the third device (90) is tilted with respect to the ideal middle plane (P). In one aspect according to the preceding aspect the extension direction of the arm (92) of the third device (90) is tilted with respect to the ideal middle plane by an angle comprised between 10° and 30°, optionally comprised between 15° and 25°. In one aspect according to the preceding aspect the tilt of the arm (91) of the third device (90) is fixed with respect to the ideal middle plane (P).

In one aspect according to any one of the preceding aspects the extension direction of the arm (91) of the third device (90) is substantially rectilinear. In a further aspect in accordance with any one of the preceding aspects the extension direction of the arm (91) of the third device (90) is placed substantially in intersection with the rotation axis (Z) of the wheel.

In one aspect according to any one of the preceding aspects the tilt angle of the extension direction of the arm (91) of the third device (90) with respect to the ideal middle plane (P) is substantially identical to the tilt angle of the extension direction of the arm (70) of the second device (6) with respect to said ideal middle plane (P).

In one aspect according to any one of the preceding aspects the tilt angle of the extension direction of the arm (91) of the third device (90) with respect to the ideal middle plane (P) is substantially identical to the tilt angle of the extension direction of the arm (7) of the first device (5) with respect to said ideal middle plane (P).

In one aspect according to any one of the preceding aspects the direction of the extension of the arm (70) of the second device (6) and the extension direction of the arm (91) of the third device (90) define a plane which substantially intersects the rotation axis (Z). In one aspect according to the preceding aspect the plane defined by the extension directions of the arms of the second and third device (6, 90) is tilted with respect to the ideal middle plane, optionally by an angle comprised between 10° and 30°, still more optionally comprised between 15° and 25°.

In one aspect according to any one of the preceding aspects the arm (91) of the third device (90) comprises:
  a sleeve having a seat,
  a stem slidably engaged within the seat of said sleeve, wherein the stem of the third device (90) defines the rear portion (91b) and the front portion (91a) of said arm (91) of the third device (90), wherein the tool (92) of the third device (90) is carried by said stem of the same third device (90).

In one aspect according to the preceding aspect the second bar (42) is connected with the stem of the arm (91) of the third device (90) such that a rotation of said second bar (42) corresponds with movement of said stem of the same third device (90). In one aspect according to the two preceding aspects the tire changer apparatus (1) comprises a third wheel (95) fit on the second bar (42) and integral in rotation with the latter, wherein said third wheel (95) connects the second bar (42) with the stem of the arm (91) of the third device (90). In one aspect according to the preceding aspect the second wheel (95) comprises a double pulley, wherein the apparatus also comprises:
  a respective elongated first traction member (95a) engaged, at one end, with the front portion (91a) defined by the stem of the arm (91) of the third device (90) and, at an opposite end, is engaged within a first seat of the double pulley, said first traction member (95a) being configured to be wound around said pulley according to a first winding sense,
  a respective elongated second traction member (95b) engaged, at one end, with the rear portion (91b) defined by the stem of the arm (91) of the third device (90) and, at an opposite end, is engaged within a second seat of the double pulley, said second traction member (95b) is configured to be wound around said pulley according to a second winding sense opposite the first winding sense.

In one aspect according to the preceding aspect the arm (91) of the third device (90), following a movement of the stem of the third device (90) adapted to carry the front portion (91a) of said arm (91) towards the rotation axis (Z), rotates said third wheel (95) by a driving action of the respective first traction member (95a). In one aspect according to the preceding aspect the arm (91) of the third device (90), following a movement of the stem of the third device (90) adapted to carry the front portion (91a) of said arm (91) away from the rotation axis (Z), rotates said third wheel (95) by a driving action of the respective second traction member (95b). In one aspect according to the three preceding aspects the first traction member (95a) engaged directly with the arm (91) of the third device (90) comprises at least one of: a chain, a rope, a belt. In one aspect according to the four preceding aspects the second traction member (95b) engaged with the arm (91) of the third device (90) comprises at least one of: a chain, a rope, a belt. In one aspect according to any one of the preceding aspects the second bar (42) is placed at the side of the sleeve of the arm (91) of the third device (90). In one aspect according to the preceding aspect the third device (90) is interposed between the second bar (42) and the ideal middle plane (P).

In one aspect according to any one of the preceding aspects said translation actuator (31) is active on at least one stem (13, 23) of the first, second and third devices (5, 6, 90) to move the latter with respect to the rotation axis (Z). In one aspect according to any one of the preceding aspects the stem and the sleeve of the third device (90) are engaged with each other by a constraint of sliding block type. In one aspect in accordance with the three preceding aspects the third device (90) comprises a carriage (90a) slidably movable along the guide (12) of the second column (4b) along a direction parallel to the rotation axis (Z). In one aspect according to the preceding aspect the carriage (90a) of the third device (90) stably carries the arm (91) of the third device (90) itself. In one aspect according to the preceding aspect the carriage (90a) of the third device (90) is fixed to the sleeve of the third device (90) itself. In one aspect according to any one of the preceding four aspects the guide (12) of the second column (4b) and the carriage (90a) of the third device (90) are engaged with each other by a constraint of sliding block type. In one aspect according to the preceding five aspects the carriage (90a) of the third device (90) is movable along said guide (12) of the second column (4b) towards and away from the base (2). In one aspect according to any one of the preceding aspects the first device (5) is movable via sliding along the guide (11) of the first column (4a) independent of the relative movement via sliding of the third device (90) along the guide (12) of the second column (4b). In one aspect according to any one of the preceding aspects the second device (6) is movable via sliding along the guide (12) of the second column (4b) independent of the relative movement via sliding of the third device (90) along the guide (12) of the second column (4b).

In one aspect according to any one of the preceding aspects the tire changer apparatus (1) comprises a lifting actuator active on at least one of said first, second and third devices (5, 6, 90), said lifting actuator being configured to move of at least one of said first, second and third devices (5, 6, 90) relative to the base (2) along a direction substantially parallel to the rotation axis (Z) of the wheel. In one aspect according to any one of the preceding aspects the lifting actuator comprises a third lifting actuator (21c) separate from the first and second lifting actuators (21a, 21b) which is configured to move the carriage (90a) of the third device (90) independently from the movement of the carriages of the first and/or second device (5, 6). In a further aspect in accordance with any one of the preceding aspects the third lifting actuator (21c) is configured to move the third device (90) along the guide (12) of the second column (4b) towards and away from the base (2).

In one aspect according to any one of the preceding aspects the tool (92) of the third device (90) comprises a bead breaker tool configured to act thrustingly on the second bead of the tire to partial separation (or completely separate) said second bead from the second perimeter edge of the rim. In one aspect according to the preceding aspect the bead breaker tool comprises a rotary body defining, with the tire, a friction of rolling type, the rotary body being configured to rotate around an axis thereof in an operative condition in which the wheel rotates around the rotation axis (Z) and the rotary body contacts the tire. In one aspect according to the preceding aspect the rotary body comprises at least one selected of: a disc, a cylinder, a sphere.

In one aspect according to any one of the preceding aspects the tire changer apparatus comprises a brake (50) configured to block the movement at least of the front portion of at least one of the arms (7, 70) of the first and second devices (5, 6). In one aspect according to the preceding aspect the brake (50) is configured to block only one arm of the tire changer apparatus (1). In one aspect according to the two preceding aspects the tire changer apparatus comprises one and only one brake (50). In one aspect according to the three preceding aspects the brake (50), optionally the single brake, is configured to block at least one front portion of only one arm and consequently, by connecting the front portions (7a, 70a) of the arms (7, 70), blocking the movement of both front portions of the arms of the first and second devices.

In one aspect according to any one of the preceding aspects the transmission (60) connects the arms of the tire changer apparatus (1), wherein the brake (optionally the single brake) is configured to directly block the front portion of only one of the arms of the apparatus while the transmission (60) synchronizes the remaining arms and hence allows to block the latter. In one aspect according to any one of the preceding aspects the brake (optionally the single brake) directly blocks only one extensible arm.

In one aspect according to the three preceding aspects the brake (50) is configured to act directly on at least one of:
the first bar (41),
the second bar (42),
the transmission (60), optionally on at least one of: the drive element (49), the first transmission member (43), the second transmission member (44).

In one aspect according to the four preceding aspects the brake (50) comprises:
a disc (51) fit on the first or second bar (41, 42),
a gripper (52) acting on the disc (51) to block the rotation thereof and thus block the rotation of the bar on which said disc is fit.

In one aspect according to the five preceding aspects the gripper (52) is arranged in a normally closed configuration in which it blocks the rotation of the disc. In one aspect according to the preceding aspect the translation actuator (31) is activated by a servocontrol, said servocontrol being connected to the brake (50) to control the gripper (52) to release the disc (51). In one aspect according to the two preceding aspects, the activation of the servocontrol activate the translation actuator (31) and simultaneously controls the gripper to release the disc (51).

In one aspect according to any one of the preceding aspects the wheel-holder (3) comprises:
a motorized shaft (3a) emerging from the base (2) and extended between a first and a second end portion, wherein the shaft (3a) is engaged with the base (2) at the first end portion,
a support plate (3b) constrained to said shaft (3a) at the second end portion, on the opposite side with respect to the base (2), said support plate (3b) being configured to directly support a rim of a wheel.

In one aspect according to the preceding aspect the wheel-holder (3) comprises a pin (3d) emerging from the support plate (3b) on the opposite side with respect to the shaft (3a), the pin (3d) being configured to engage a portion of the rim to oppose a relative rotation between said rim and the support plate (3b). In one aspect according to the preceding aspect the thrust (3d) is movable relative to the support plate (3b) along a plane orthogonal to the rotation axis (Z). In one aspect according to the preceding aspect the thrust (3d) is adjustable in position with respect to the rotation axis (Z).

In one aspect according to any one of the preceding aspects the base (2) extends between a front portion (2a) and a rear portion (2b). In one aspect according to the preceding aspect the frame (4) emerges from the base (2) at the rear portion (2b) of said base (2). In one aspect according to the two preceding aspects the wheel-holder (3) emerges from the base (2) at a portion interposed between the front portion and the rear portion of said base (2).

In one aspect according to any one of the preceding aspects the tire changer apparatus (1) comprises a control unit which controls said translation actuator (31) to move the front portion of the arms of the tire changer apparatus relative to the rotation axis (Z). In one aspect according to the preceding aspect the control unit is configured to:
receive, in input, a signal representative of a characteristic of a wheel,
as a function of said representative signal, control the translation actuator (31) to move at least the front portion of the arms, hence the tools carried by said arms, into a pre-established work position.

In one aspect according to any one of the preceding aspects the control unit is configured to receive, in input, said representative signal by at least one of:
- a manual insertion by an operator of a parameter representative of said characteristic of a wheel,
- a measurement executed by sensors connected to the control unit and configured to emit said signal representative of a characteristic of a wheel.

In one aspect according to any one of the preceding aspects the control unit, following the extension movement of the arms relative to the rotation axis (Z), is configured to control the lifting actuator to move at least one of the devices (at least one of the first, second and third device) along a direction substantially parallel to the rotation axis (Z).

A further aspect concerns a process of dismounting a tire from a rim of a wheel of a vehicle by a tire changer apparatus (1) according to any one of the preceding aspects.

In one aspect according to any one of the preceding aspects the wheel is of the type comprising:
- a rim comprising a hub configured to allow the mounting of the rim on the vehicle and a first and second perimeter edge that are opposite and configured to allow the engagement of a tire,
- a tire comprising:
  - a first bead configured to be engaged with the first perimeter edge of the rim,
  - a second bead configured to be engaged with the second perimeter edge of the rim,
  - a tread defining, in use, the contact element of the tire with the asphalt,
  - a first sidewall which connects the first bead to the tread,
  - a second sidewall which connects the second bead to the tread, wherein the dismounting process comprises the following steps:
- mounting the wheel on the wheel-holder (3),
- moving, in a synchronized manner by the transmission (60), at least the front portion (7a, 70a) of the arms (7, 70) of the first and second devices (5, 6) such that the respective tools (8, 80) may operate on the rim and/or tire of the wheel carried by the wheel-holder (3).

In one aspect according to any one of the preceding aspects the step of moving the arms comprises the steps of:
- moving at least the front portion (70a) of the arm (70) of the second device (6), optionally by the translation actuator (31),
- by the transmission (60), rotating the first bar (41) and hence allowing the movement the front portion (7a) of the arm (7) of the first device (5).

In one aspect according to any one of the preceding aspects the process also comprises the steps of:
- placing the wheel in rotation around the rotation axis (Z),
- pressing the first bead of the tire by the tool (80) of the second device (6) to generate a separation of the first bead from the first perimeter edge of the rim,
- following the separation of the first bead from the first edge of the rim, radially interposing the tool (8) of the first device (5) between said first bead and the first perimeter edge of the rim,
- extracting at least part of the first bead from the first perimeter edge of the rim by said tool (8) of the first device (5),
- following the partial extraction of the first bead from the first perimeter edge of the rim and during the radial interposition of the tool (8) of the first device (5) between said first bead and the first perimeter edge of the rim, rotating the wheel around the rotation axis (Z) to completely disengage the first bead from the first perimeter edge of the rim.

In one aspect according to any one of the preceding aspects, following the mounting of the wheel on the wheel-holder (3) and before the rotation of the same, the process comprises the steps of:
- acquiring a first characteristic representative of at least one of the diameter of the rim and the diameter of the tire of the wheel mounted on the wheel-holder (3),
- as a function of said first characteristic, executing the movement of the arms (an arm of at least one of the first, second and third device) towards or away from the rotation axis (Z) to position the tools carried by said arms into a desired work position in which said tools are adapted to operate on the rim and/or on the tire.

In one aspect according to any one of the preceding aspects following the radial interposition of the tool (8) of the first device (5) between said first bead and the edge of the rim, the process provides for the separation of the tool (80) of the second device (6) of the wheel. In one aspect according to any one of the preceding aspects, following the radial interposition of the tool (8) of the first device (5) between said first bead and the edge of the rim, the second device (6) is moved away from the wheel along the guide (12) of the second column (4b). In one aspect according to any one of the preceding aspects the step of radially interposing the tool (8) of the first device (5) between said first bead and the edge of the rim provides for the movement of the first device (5) along the guide (11) of the first column (4a) towards the wheel (optionally by sliding the carriage 5a along the guide 11 of the first column 4a). In one aspect according to any one of the preceding aspects the process also comprises the step of pressing the second bead of the tire by the tool (92) of the third device (90) to generate a separation of the second bead from the second perimeter edge of the rim. In one aspect according to any one of the preceding aspects the step of separation of the second bead is executed before the step of radial interposition of the tool (8) of the first device (5) between said first bead and the edge of the rim.

In one aspect according to any one of the preceding aspects following the complete disengagement of the first bead from the first perimeter edge of the rim, the process comprises the following steps:
- stopping the rotation of the wheel around the rotation axis (Z) thereof,
- at least partly placing the second bead of the tire in contact with the first perimeter edge of the rim,
- following the contact of the second bead of the tire with the first perimeter edge of the rim, radially interposing the tool (92) of the third device (90) between said second bead and the first perimeter edge of the rim to allow said tool (92) of the third device (90) to extract at least part of the second bead from the first perimeter edge of the rim,
- following the partial extraction of the second bead from the first perimeter edge of the rim and during the radial interposition of the tool (92) of the third device (90) between said second bead and the first perimeter edge of the rim, rotating the wheel around the rotation axis (Z) to completely disengage the tire from the rim.

A further aspect concerns a process of mounting a tire on a rim of a wheel of a vehicle by a tire changer apparatus (1) according to any one of the preceding aspects.

In one aspect according to the preceding aspect the wheel comprises:
- a rim comprising a hub configured to allow the mounting of the rim on the vehicle and a first and second perimeter edge that are opposite and configured to allow the engagement of a tire,
- a tire comprising:
  - a first bead configured to be engaged with the first perimeter edge of the rim,
  - a second bead configured to be engaged with the second perimeter edge of the rim,
  - a tread configured to define, in use, the contact element of the tire with the asphalt,
  - a first sidewall which connects the first bead to the tread,
  - a second sidewall which connects the second bead to the tread,
- wherein the mounting process comprising the following steps:
  - placing the second bead of the tire in contact with the first perimeter edge of the rim,
  - radially interposing the tool (80, 92) of the second or third device (6, 90) between the second bead of the tire and the first perimeter edge of the rim such that said tool allows the engagement of a part of the second bead with the first perimeter edge of the rim,
  - following the partial engagement of the second bead with the first perimeter edge of the rim and during the radial interposition of the tool between said second bead and the first perimeter edge of the rim, placing the wheel in rotation around the rotation axis (Z) to completely engage the second bead with the first perimeter edge of the rim, wherein, following the complete engagement of the second bead with the first perimeter edge of the rim, said second bead is interposed between the first and the second perimeter edge of the rim,
  - arranging the second bead at the second perimeter edge of the rim and arranging the first bead at the first perimeter edge of the rim,
  - pressing, with the tool (8, 80) of the first and/or second device (5, 6), the first bead towards the second bead of the tire up to partial engagement of the first bead with the first perimeter edge of the rim,
  - following the partial engagement of the first bead with the first perimeter edge of the rim and during the action of pressing the tool of the first and/or second device on the first bead, putting the wheel in rotation around the rotation axis (Z) to completely engage the first bead with the first perimeter edge of the rim, wherein, following the complete engagement of the first bead with the first perimeter edge of the rim, the first and the second bead are both interposed between the first and the second perimeter edge of the rim.

DESCRIPTION OF THE DRAWINGS

Several aspects will be described hereinbelow with reference to the enclosed drawings, provided only as a non-limiting example, in which.

DEFINITIONS

Figure 1:
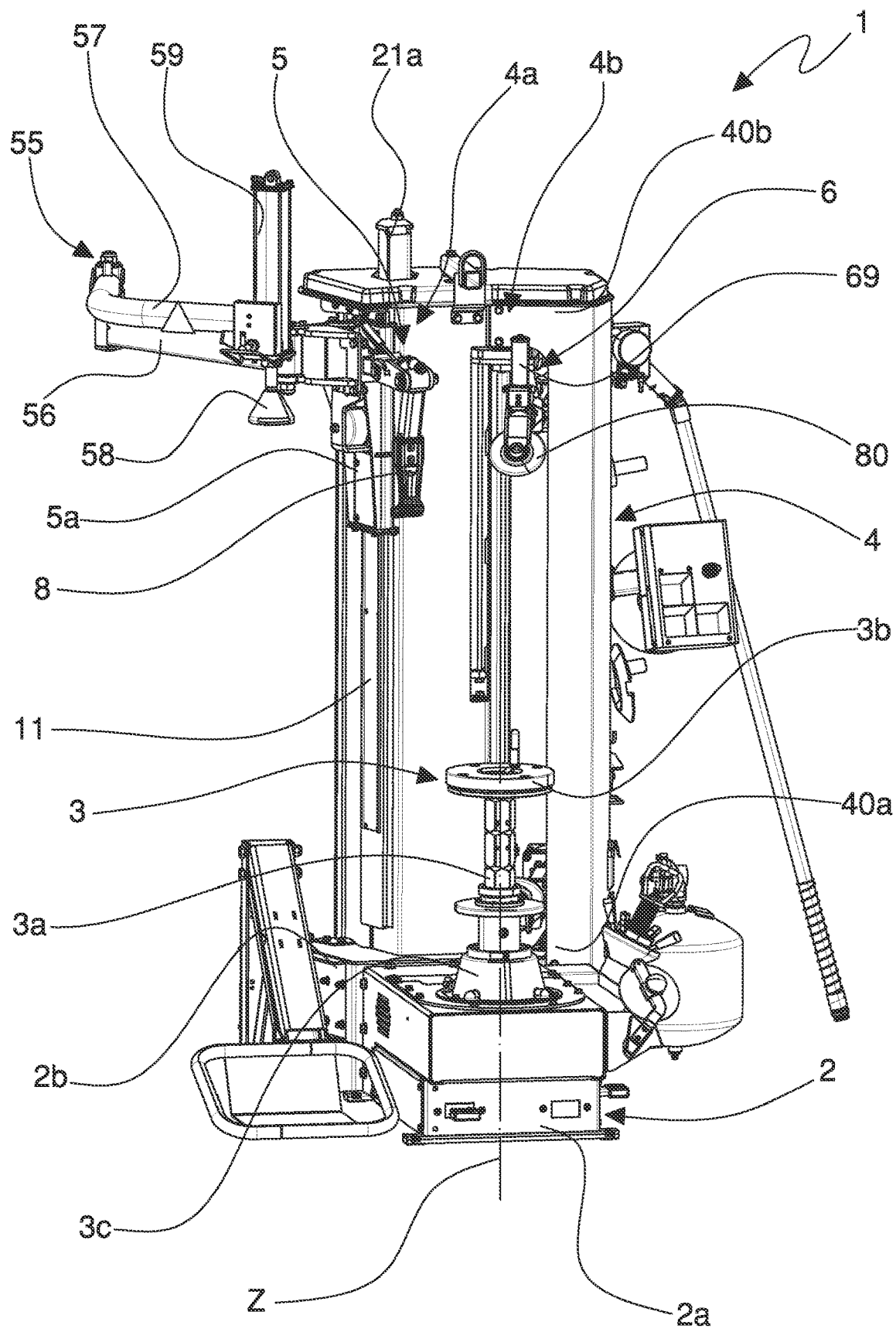
FIG. 1 is a perspective view of a tire changer apparatus.

It is observed that in the present detailed description, corresponding parts illustrated in the various figures are indicated with the same reference numbers. The figures could illustrate the object of the invention by not scaled representations; therefore, parts and components illustrated in the figures relative to the object of the invention might only regard schematic representations.

The terms "horizontal" or "vertical", used in relation to components of the tire changer apparatus, refer to a use condition of the same during which the apparatus executes, or is usable for executing, a procedure of mounting and/or dismounting of a tire from a rim of a wheel.

The tire changer apparatus described and claimed hereinbelow may comprise/use at least one control unit set for controlling operative conditions implemented by the same apparatus and/or for controlling the steps of the process of dismounting and mounting of a tire from/on a rim of a wheel. The control unit may be a single unit or be formed by a plurality of separate control units depending on the design selections and on the operative needs.

With 'control unit' it is intended an electronic component which may comprise at least one of the following: a digital processor (CPU), a circuit of analog type, or a combination of one or more digital processors with one or more circuits of analog type. The control unit may be "configured" or "programmed" for executing several steps: this may be attained in practice with any means that allows configuring or programming the control unit. For example, in the case of a control unit comprising one or more CPUs and one or more memories, one or more programs may be stored in suitable memory banks connected to the CPU or to the CPUs; the program or programs contain instructions which, when executed by the CPU or by the CPUs, program or configure the control unit to execute the operations described in relation to the control unit. Alternatively, if the control unit is or comprises circuitry of analog type, then the circuit of the control unit may be designed to include circuitry configured, in use, for processing electrical signals so as to execute the steps relative to the control unit.

Parts of the process described herein may be attained by data processing unit, or control unit, which may be technically substituted with one or more computers conceived for executing a portion of software or firmware program loaded on a memory support. Such software program may be written in any one programming language of known type. The computers, if there are two or more of these, may be connected together by data connection such that their computing powers are shared in any manner; the same computers may therefore be installed in positions that are even geographically different, attaining a distributing computing environment by the aforesaid data connection. The data processing unit, or control unit, may be a processor of general purpose type, configured to execute one or more parts of the process identified in the present document through the software or firmware program, or be an ASIC or dedicated processor or a FPGA, specifically programmed for executing at least part of the operations of the process described herein.

The memory support may be non-transient and may be inside or outside the processor, or control unit, or data processing unit, and may—specifically—be a memory geographically situated remotely with respect to the electronic processor. The memory support may also be physically divided into multiple portions, or in cloud form, and the software or firmware program may physically provide for portions stored on memory portions that are geographically divided from each other.

With "actuator" it is intended any device capable of causing a movement on a body, e.g., upon command of the control unit (reception by the actuator of a command sent by the control unit). The actuator may be of electric type (e.g., an electric motor), pneumatic type, mechanical type (e.g., with a spring), oil-pressure type or of still another type.

With 'wheel' (R) it is intended an assembly comprising a rim coupled to a tire.

With 'rim' it is intended a component adapted to support a tire and comprising an anchorage zone where a hub is defined for the engagement with an axle of the wheel of a vehicle. The rim externally comprises a seat, extended in a radially outer position and axially delimited by a first and by a second perimeter edge: at the seat, a tire may be engaged.

With 'tire' it is intended any covering element, e.g., multilayer, mountable at the seat of a rim of a vehicle. The tire comprises:
 a first bead configured to be engaged with the first edge of the rim,
 a second bead configured to be engaged with the second edge of the rim,
 a tread configured to define the contact element of the tire with the ground,
 a first flank which connects the first bead to the tread,
 a second flank which connects the second bead to the tread, The distance between the first or second bead from the tread essentially defines the height of the tire, while the distance between the first and second flanks essentially defines the width of the tire, which substantially coincides with the width of the rim defined by the distance between the above-described first and second edges.

DETAILED DESCRIPTION

Tire Changer Apparatus

Reference number 1 indicates a tire changer apparatus for mounting and/or dismounting tires from a rim of a wheel. The tire changer apparatus 1 comprises a base 2 defining the support element for the various parts of the apparatus 1 described hereinbelow. The base 2 extends longitudinally between a front portion 2a and a rear portion 2b (FIG. 2).

The tire changer apparatus 1 also comprises a wheel-holder 3, coupled to the base 2, configured to receive and engaging a wheel; the wheel-holder 3 is further configured to rotate the wheel around a rotation axis Z. The wheel-holder 3 comprises a motorized shaft 3a emerging from the base 2 and extended between a first and a second end portion; the first end portion of the motorized shaft 3a is placed at the base 2 while the second end portion, emerging from the base 2, carries a plate or another support means 3b stably supporting a rim of a wheel. In detail, the support plate 3b is configured to be constrained directly to the anchorage zone of the rim and rotating integrally with the motorized shaft 3a around an axis coinciding with the rotation axis Z. In the enclosed figures, the rotation axis Z of the wheel extends, in use conditions of the tire changer apparatus 1, along a substantially vertical direction; nevertheless, the axis Z of the wheel-holder may be, in use, horizontal or tilted by an angle comprised between 0° and 90°, with respect to a horizontal reference plane.

The wheel-holder 3 may comprise a guide body 3c in tubular form, e.g., with circular section; the guide body 3c may emerge from the base 2, parallel to the rotation direction Z, and at least partly enclose the motorized shaft 3a to define a casing adapted to at least partially enclose and protect the motorized shaft 3a.

Figure 2:
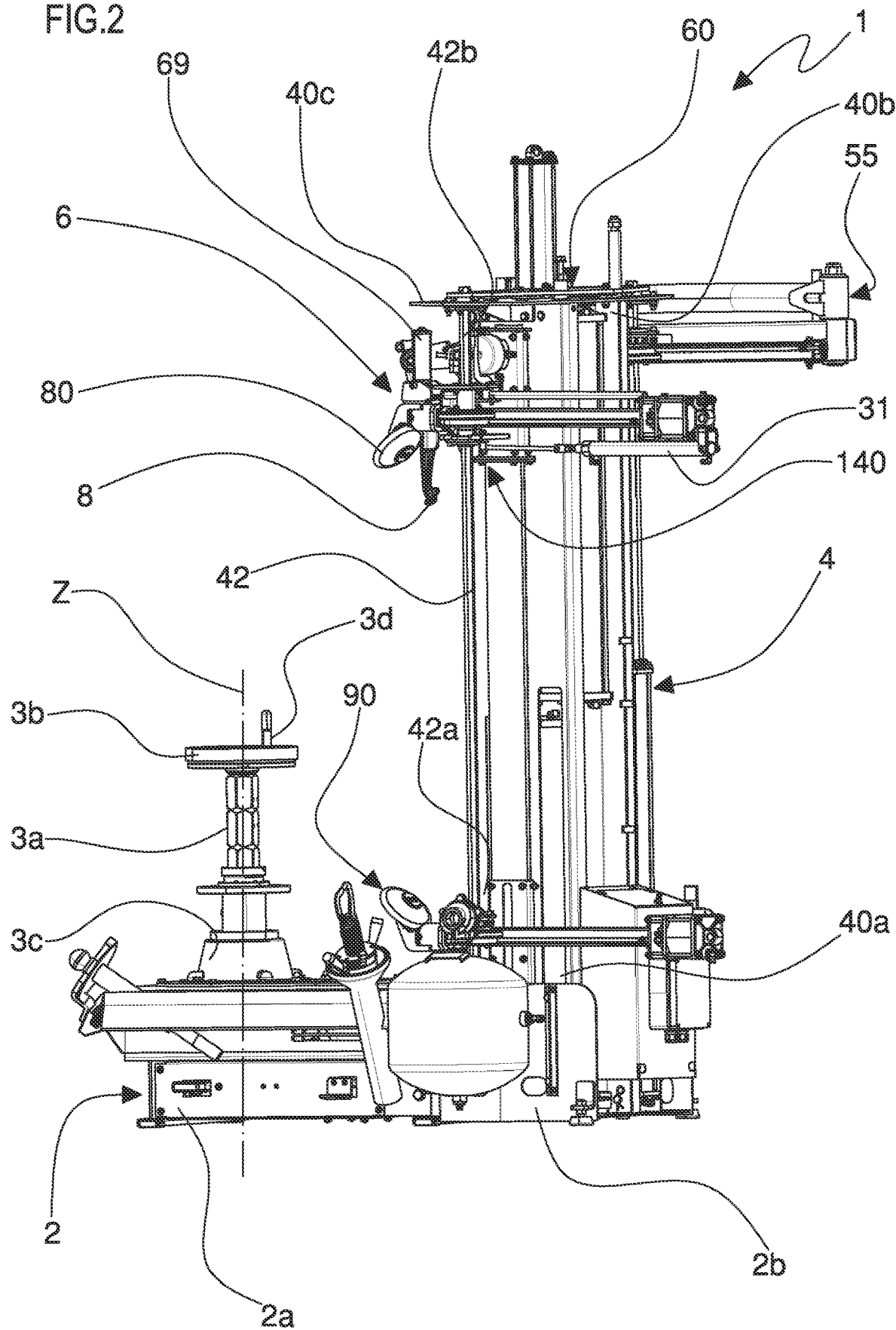
FIG. 2 is a side view of the apparatus of FIG. 1.
Figure 3:
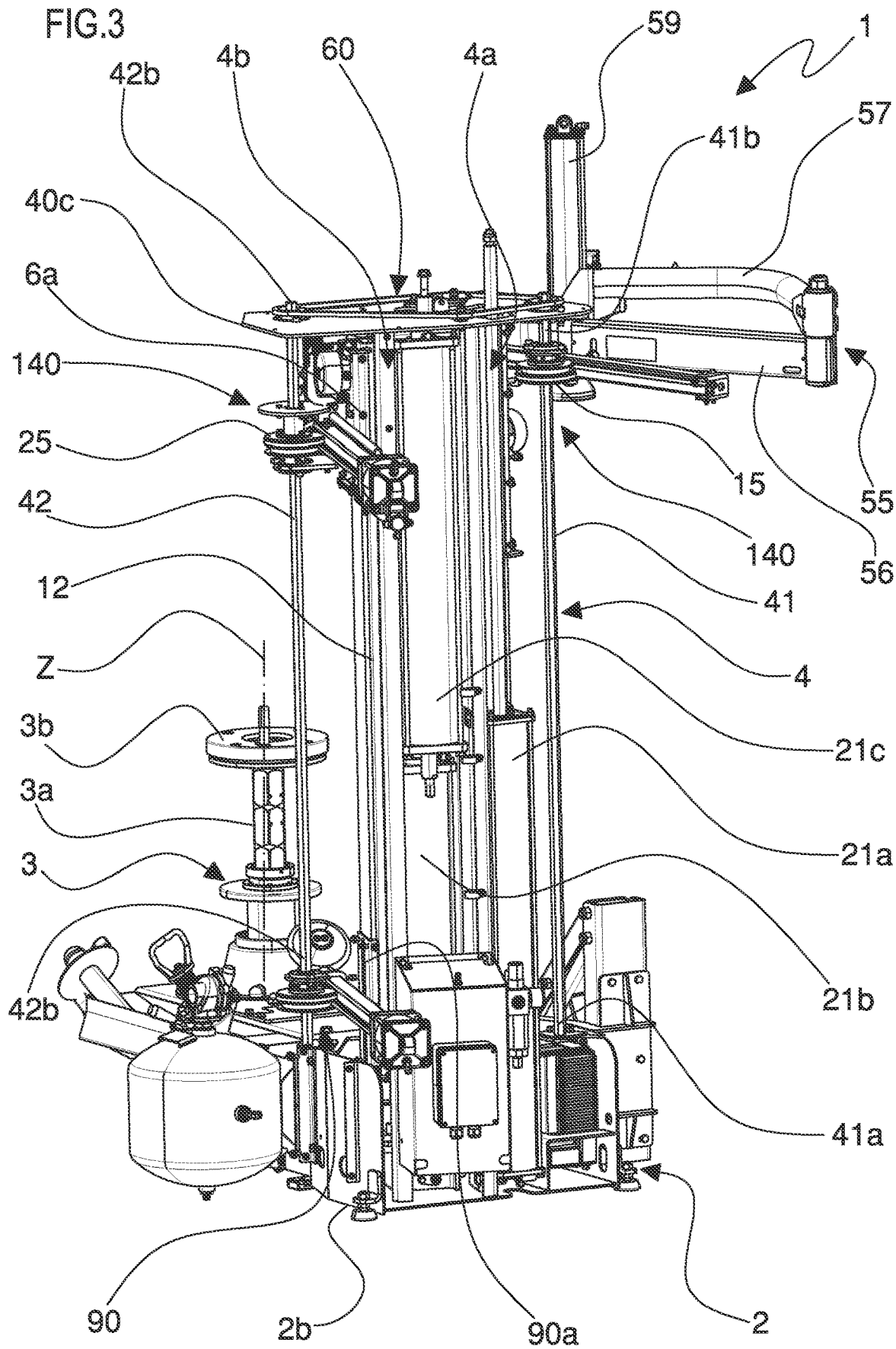
FIG. 3 is a partially rear perspective view of a tire changer apparatus of FIG. 1.

As shown in FIG. 2, the wheel-holder 3 may comprise a pin 3d emerging from the support plate 3b on the opposite side with respect to the shaft 3a; the pin 3d is configured to engage at least one portion of the rim to oppose a relative rotation between said rim and the support plate 3b. The pin 3d is radially offset with respect to the rotation axis Z and movable relative to the support plate 3b along a plane orthogonal to said rotation axis Z such that the radial position of the pin 3d is adjustable with respect to the position of the rotation axis Z; in this manner, it is possible to adapt the position of the pin 3d as a function of the size/shape of the rim to be engaged on the support plate 3b. In general, the pin 3d is moved with respect to the rotation axis Z to allow the insertion of the same within a hole of the rim dedicated to receiving the screws of the fixing plate of the vehicle on which the rim must be mounted.

As shown in FIG. 1, the support plate 3b has, at the center of the same, a blocking hole (the blocking hole is placed concentrically with the rotation axis Z) configured to receive a pin configured to block the rim on the wheel-holder 3. The pin may be of known type and comprises a threaded screw adapted to traverse the hub of the rim in abutment against the support plate 3b to engage the blocking hole; on the side opposite the screw, the pin comprises a frustoconical form centering device configured to act on the hub of the rim to crush the latter on the support plate 3b and hence engaging the wheel on the wheel-holder 3.

As shown for example in FIG. 2, the wheel-holder 3 is arranged in interposition between a front portion 2a and a rear portion 2b of the base 2, e.g., moved more towards the front portion 2a.

The wheel-holder 3 may have a shaft 3a that is height-adjustable or movable along a direction parallel to the rotation axis Z. In this way, the shaft 3a moves the support plate 3b relative to the base 2 such that the operator may adjust the height of the support plate 3b, as a function of the size of the wheel.

The support body 3c of the wheel-holder 3 is nevertheless fixed to the base 2 to prevent the wheel-holder relative movements with respect to the base according to a plane orthogonal to the rotation axis Z. In fact, the only relative movements of the wheel-holder 3 with respect to the base are:
 the relative rotation of the shaft 3a, consequently of the support plate 3b and of the pin 3d, around the rotation axis Z,
 the movement of the shaft 3a, consequently of the support plate 3b and of the pin 3d, along a direction parallel to the rotation axis Z.

No further movement is provided for the wheel-holder with respect to the base 2.

As described above, the shaft 3a is motorized and rotatable around the axis Z. The first end of the shaft may be placed within a spaced defined by the base within which an actuator is present, for example an electric motor or inverter, coupled to the shaft 3*a* and configured to rotate thereof around the axis Z. Such actuator may be manually activated by an operator or it may be managed by a control unit; the control unit may control the inverter and/or the electric motor to consequently control the rotation of the shaft 3*a*. If the tire changer apparatus includes the control unit, the latter may be configured to: monitor the angular position of the shaft 3*a*, control the rotation speed of the shaft 3*a*.

As is visible from the enclosed figures, the tire changer apparatus 1 comprises a frame 4 emerging from the base 2 substantially at the rear portion 2*b* (FIG. 2). The frame 4 is fixed to the base 2 in a distal position with respect to the wheel-holder 3. The frame 4 extends mainly along a direction substantially parallel to the rotation axis Z. In the enclosed figures, a frame 4 is illustrated that extends, in a non-limiting manner, along a vertical direction. In detail, the frame 4 extends between a bottom portion 40*a* placed at the base 2 and a top portion 40*b* opposite the bottom portion 40*a*; as is visible in FIGS. 2, 3 10 and 11, at the top portion 40*b*, the frame 4 comprises a flat plate 40*c*, defining a 'roof' of the tire changer apparatus 1.

The frame 4 supports a first and a second devices 5, 6 (FIG. 1) which, as will be better described hereinbelow, are configured to operate on a rim and/or on a tire to mount/dismount of the latter on/from said rim.

Figure 12:
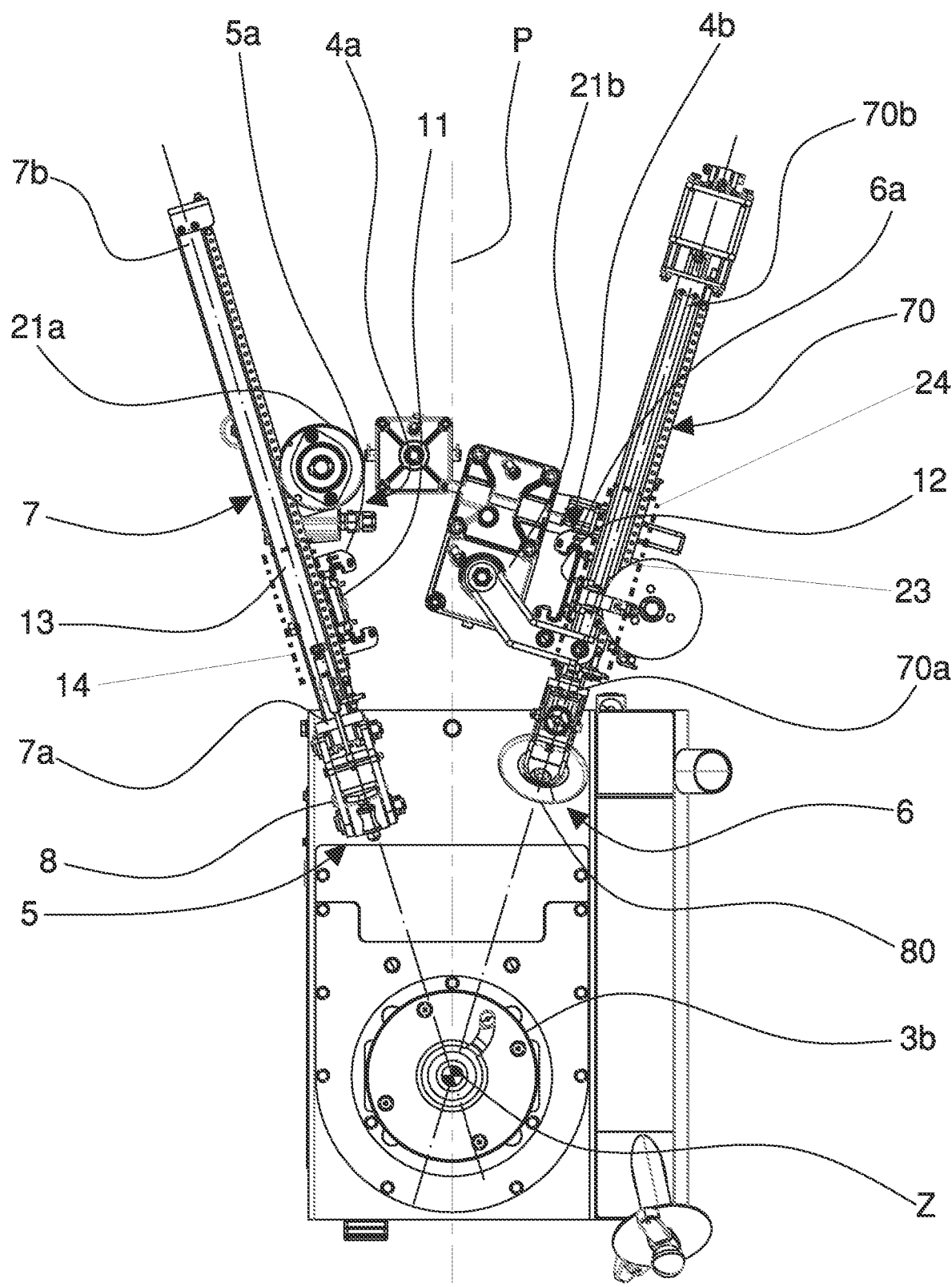
FIG. 12 is a top schematic view of the tire changer apparatus of FIG. 1.

The frame 4 comprises a first and a second column 4*a*, 4*b* emerging from the base 2 along a direction parallel to the rotation axis Z; the first and the second column 4*a*, 4*b* are opposite each other with respect to an ideal middle plane P of the tire changer apparatus 1 parallel to the rotation axis Z (the ideal middle plane P has been schematized in FIG. 12). The ideal middle plane P is, in a non-limiting manner, vertical and it extends along a direction of connection of the front portion 2*a* with the rear portion 2*b* of the base 2. The ideal middle plane may pass through the rotation axis Z; of course, the wheel-holder 3 may be offset with respect to the ideal middle plane: in such configuration the ideal middle plane does not incorporate the rotation axis Z of the wheel-holder 3. Tire changer apparatus 1 may have a horizontal ideal middle plane P or an ideal middle plane P tilted by an angle comprised between 0° and 90° with respect to a horizontal reference plane.

The first and the second column 4*a*, 4*b* are arranged symmetrically with respect to the ideal middle plane P (FIG. 12); the distance of the first column 4*a* with respect to the ideal middle plane P may be identical to the distance present between said ideal middle plane P and the second column 4*b*. In addition, the first and the second column 4*a*, 4*b* may be arranged at a same distance from the rotation axis Z (FIG. 12).

The first column 4*a* may comprises a guide 11 extended parallel to the rotation axis Z; the guide 11 of the first column 4*a* comprises a flat track extended starting from the bottom portion 40*a* of the frame 4 up to the top portion 40*b*; e.g., the guide 11 extends starting from the base 2 up to the support plate 40*c*, over the entire height of the frame 4.

The track defined by the guide 11 lies on a plane tilted with respect to the ideal middle plane P. In detail, the tilt present between the plane defined by the track of the guide 11 and the ideal middle plane is comprised between 10° and 30°, optionally comprised between 15° and 25°.

As will be better described hereinbelow, the track of the guide 11 directly carries the first device 5 and allows the sliding of the latter along a direction parallel to the rotation axis Z. In detail, the guide 11 of the first column 4*a* and the first device 5 are engaged by a constraint of sliding block type: the first device 5 is slidably movable along the track of the guide 11 and blocked in rotation with respect to the latter.

The second column 4*b* comprises a guide 12 extended parallel to the rotation axis Z; the guide 12 of the second column 4*b* comprises a respective flat track extended starting from the bottom portion 40*a* of the frame up to the top portion 40*b*; e.g., the guide 12 extends starting from the base 2 up to the support plate 40*c*, over the entire height of the frame 4.

The track defined by the guide 12 lies on a plane tilted with respect to the ideal middle plane P. In detail, the tilt present between the plane defined by the track of the guide 12 and the ideal middle plane is comprised between 10° and 30°, optionally comprised between 15° and 25°. In a non-limiting manner, the tilt angle of the track of the guide 12 of the second column 4*b* may be identical to the tilt angle of the track of the guide 11 of the first column 4*a* (see for example the FIG. 12). The tracks of the guides 11 and 12 may be arranged at the same distance from the ideal middle plane P and at the same distance from the rotation axis Z.

The track of the guide 12 of the second column 4*b* directly constrain the second device 6 (optionally also a third device 90) and allows said second device to slide along a direction parallel to the rotation axis Z. The guide 12 and the second device 6 are engaged by constraint of sliding block type: the second device 6 is slidably movable along the track of the guide 12 and blocked in rotation with respect to the latter.

The axial movement of the first and second devices 5, 6 along the respective guides 11, 12 is generated by a lifting actuator: such actuator is configured to move at least one of said first and second devices 5, 6 relatives to the base 2 along a direction parallel to the rotation axis Z.

The first device 5 comprises a arm 7 carried by the first column 4*a* and extended between a front portion 7*a* directed towards the rotation axis Z and an opposite rear portion 7*b*; the arm 7 of the first device 5 is configured to move at least said front portion 7*a* relative to the wheel-holder 3 to vary a distance between said front portion 7*a* of the arm 7 of the first device 5 and the rotation axis Z. At the front portion 7*a*, the arm 7 stably carries a tool 8 configured to operate on a rim and/or a tire of a wheel carried by the wheel-holder 3.

The arm 7 of the first device 5 is movable towards and away from the rotation axis Z to move the tool 8 of said first device 5 between a retreated position and an advanced position; the tool 8 of the first device 5, in the retreated position, has a distance from the rotation axis Z greater than a distance present between said rotation axis Z and said tool 8 when arranged in the advanced position. The tool 8 of the first device 5, in the retreated position, may have a distance from the ideal middle plane P greater than a distance present between said ideal middle plane P and said tool 8 of the first device 5 when arranged in the advanced position. In detail, the tool 8 of the first device 5, in the retreated position, has a distance from the ideal middle plane P substantially comprised between 80 mm and 300 mm, optionally between 100 mm and 200 mm, while, in the advanced position, the same tool 8 has a distance from the ideal middle plane P comprised between 30 mm and 200 mm, optionally between 50 mm and 100 mm.

Even if the arm 7 is movable towards and away from rotation axis Z, the tool 8 of the first device 5 is configured to maintain a distance from said ideal middle plane P and remaining on the same side on which the guide 11 of the first column 4*a* is present: the arm 7 of the first device 5 does not intersect the ideal middle plane P.

As is visible for example in FIG. 12, the arm 7 of the first device 5 extends, in a non-limiting manner, along an rectilinear extension direction lying on a plane orthogonal to the rotation axis Z; nevertheless, arm 7 having different shape and size may be used. The extension direction of the arm 7 defines a tilt angle of with the ideal middle plane P that may be comprised between 10° and 30°, still more optionally comprised between 15° and 25°. Such tilt is fixed: the arm 7 is not rotatable/tiltable with respect to the ideal middle plane P.

The extension direction of the arm 7 may intersect the rotation axis Z (see FIG. 12); even following the movement of the arm 7 towards or away from the rotation axis Z, the extension direction of the arm 7 intersects the rotation axis Z.

The arm 7 of the first device 5 may comprise a sleeve 13 having a seat, as well as a stem 14 slidably engaged within the seat of the sleeve 13: the stem 14 defines the rear portion 7b and the front portion 7a, the latter carrying the tool 8 of the first device 5. The stem 14 is entirely movable with respect to the rotation axis Z such that the entire stem 14 (i.e., both the front portion 7a and the rear portion 7b defined by the stem itself) is movable towards and away from said rotation axis Z. In the enclosed figures, a sleeve 13 was illustrated in a non-limiting manner that comprises a hollow tubular body with quadrangular section; the stem 14 may have a section at least partly counter-shaped to the section of the sleeve 13 such that said stem 14 is movable with respect to the sleeve 13 only via translation: the stem 14 does not rotate within the sleeve 13. In other words, stem 14 and sleeve 13 are engaged with each other by a constraint of sliding block type.

The second device 6 comprises a respective arm 70 carried by the second column 4b and extended between a front portion 70a directed towards the rotation axis Z and an opposite rear portion 70b; the arm 70 of the second device 6 is configured to move at least said front portion 70a relative to the wheel-holder 3 to vary a distance between said front portion 70a of the arm 70 of the second device 6 and the rotation axis Z. At the front portion 70a, the arm 70 stably carries a tool 80 configured to operate on a rim and/or a tire of a wheel carried by the wheel-holder 3.

The arm 70 of the second device 6 is movable towards and away from the rotation axis Z to move the tool 80 of said second device 6 between a retreated position and an advanced position; the tool 80 of the second device 6, in the retreated position, has a distance from the rotation axis Z greater than a distance present between said rotation axis Z and said tool 80 when arranged in the advanced position. The tool 80 of the second device 6, in the retreated position, may have a distance from the ideal middle plane P greater than a distance present between said ideal middle plane P and said tool 80 of the second device 6 when arranged in the advanced position. In detail, the tool 80 of the second device 6, in the retreated position, has a distance from the ideal middle plane P comprised between 80 mm and 300 mm, optionally between 100 mm and 200 mm, while, in the advanced position, the same tool 80 has a distance from the ideal middle plane P comprised between 30 mm and 200 mm, optionally between 50 mm and 100 mm.

The arms 7, 70 and the tools 8, 80 of the first and second devices are opposite each other with respect to the ideal middle plane P. The tool 80 of the second device 6, in the advanced position, has a distance from the rotation axis Z identical to a distance between said rotation axis Z and the tool 8 of the first device 5 when arranged in the respective advanced position. Similarly, the tool 80 of the second device 6, in the retreated position, has a distance from the rotation axis Z identical to a distance between said rotation axis Z and the tool 8 of the first device 5 when arranged in the respective retreated position.

The tool 80 of the second device 6 is configured to maintain a distance from said ideal middle plane P and thus remaining, with respect to said ideal middle plane P, on a same side on which the guide 12 of the second column 4b is present: the arm 70 of the second device 6 does not intersect the ideal middle plane P.

As is visible from the enclosed figures, the arm 70 of the second device 6 extends, in a non-limiting manner, along a rectilinear extension direction lying on a plane orthogonal to the rotation axis Z; the arm 70 may have different shape and size. The extension direction of the arm 70 may define a tilt angle with the ideal middle plane P that may be comprised between 10° and 30°, still more optionally comprised between 15° and 25°. Such tilt is fixed: the arm 70 is not rotatable/tiltable with respect to the ideal middle plane P.

The extension direction of the arm 70 may intersection the rotation axis Z; following the movement of the arm 70 towards or away from the rotation axis Z, the extension direction of the arm 70 may intersect the rotation axis Z. The tilts of the arms 7, 70 may be substantially identical to each other such that the arms 7, 70 are symmetrical arranged with respect to the ideal middle plane P. In other words, the tilt angle of the extension direction of the arm 7 of the first device 5 with respect to the ideal middle plane P is identical to the tilt angle of the extension direction of the arm 70 of the second device 6 with respect to said ideal middle plane P.

The arm 70 of the second device 6 may have, in a non-limiting manner, a structure similar to that of the arm 7 of the first device 5. In detail, the arm 70 of the second device 6 may comprise a sleeve 23 having a seat, a stem 24 slidably engaged within the seat of the sleeve 23: the stem 24 defines the rear portion 70b and the front portion 70a, the latter carrying the tool 80 of the second device 6. The stem 24 is entirely movable with respect to the rotation axis Z such that the entire stem 24 (both the front portion 70a and the rear portion 70b defined by the stem 24 itself) is movable towards and away from said rotation axis Z.

The sleeve 23 may comprise a hollow tubular body with quadrangular section; the stem 24 has a section at least partly counter-shaped with respect to the section of the sleeve 23 such that said stem 24 is movable with respect to the sleeve only via translation: the stem 24 does not rotate within the sleeve 23. In other words, stem 24 and sleeve 23 are engaged with each other by a constraint of sliding block type.

Both arms 7, 70 of the first and second devices 5, 6 are of extensible type and hence able to vary the distance thereof with respect to the rotation axis Z. Due to the extensibility of the arms 7, 70, the tire changer apparatus 1 allows moving the tools 8, 80 from a rest position, in which said tools are not configured to operate on a wheel, to a work position, in which said tools are configured to mount/dismount a tire from a rim of a wheel. Due to the extensibility of the arms 7, 70, the tire changer apparatus 1 may position the tools 8, 80 as a function of the size of the wheel mounted on the wheel-holder 3.

As is visible from the enclosed figures, the tire changer apparatus 1 may comprises a first bar 41 configured to rotate around an axis Y' parallel to the rotation axis Z; the first bar 41 is connected at least with the front portion of the arm 7 of the first device 5. A movement of the front portion 7a of the arm 7 (e.g., a translation of the entire arm 7 towards or away from the rotation axis Z) corresponds with a rotation of the first bar 41. As is visible for example in FIG. 4, the first bar 41 is placed at the first column 4a, on the side of the guide 11 of the first column 4a (the first bar 41 and the guide 11 are parallel to each other); in detail, the guide 11 of the first column 4a is interposed between the first bar 41 and the ideal middle plane P.

Figure 4:
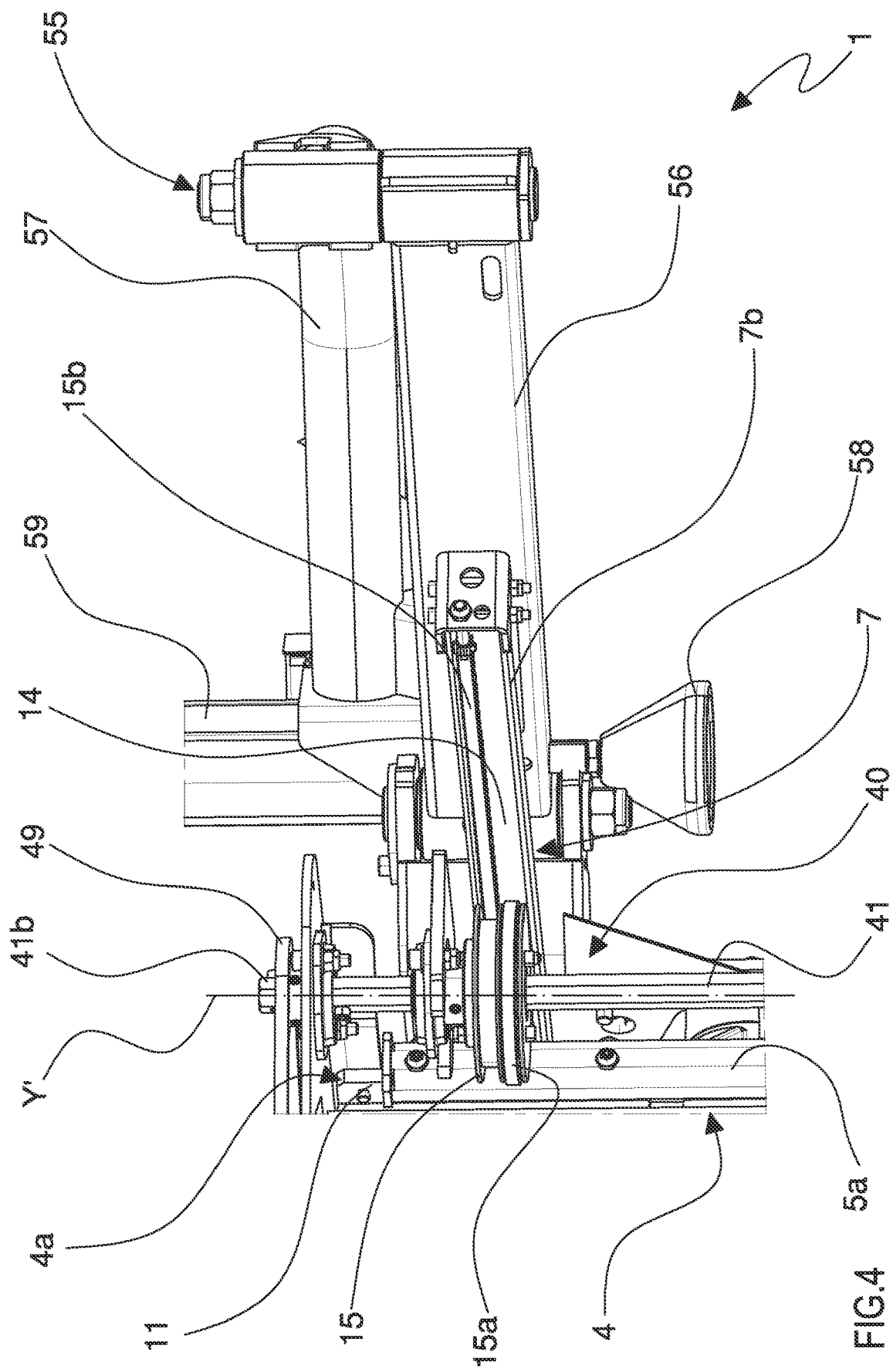
FIGS. 4 and 5 are detailed views of a first arm of a tire changer apparatus carrying a first tool, for example a mount-dismount tool, and optionally a pressure tool.

The first bar 41 may extend over the entire extension of the frame 4; in detail, the first bar 41 may extend between a first and a second end portion 41a, 41b: the first end portion 41a of the first bar 41 is arranged at the bottom portion 40a of the frame 4 while the second end portion 41b of said first bar 41 is placed at the top portion 40b of the frame 4. The first bar may extends height-wise for the entire height of the frame 4 starting from the base 2 up to the support plate 40c. As shown in FIG. 4, the first bar 41 may slightly emerge from the support plate 40c on the side opposite the base 2: at least one part of the second end portion 41b of the first bar 41 is arranged above the support plate 40c i.e., on the side opposite the base 2 with respect to the support plate 40c.

The first bar 41 has, in a non-limiting manner, a polygonal shape, optionally hexagonal; the first bar 41 has a constant section along the entire extension thereof between the first and the second end portions 41a, 41b.

The connection between the arm 7 of the first device 5 and the first bar 41 may be obtained, in a non-limiting manner, by a first wheel 15 and a traction members. In detail, as illustrated in FIG. 4, the tire changer apparatus 1 may comprise at least one first wheel 15 fit on the first bar 41 and integral in rotation with the latter: said first wheel 15 connect the first bar 41 with the stem 14 of the arm 7 of the first device 5: the first bar 41 connects the stem 14 of the arm 7 of the first device 5 such that a rotation of said first bar 41 corresponds with a movement of said stem 14 via sliding within the sleeve 13.

The first wheel 15 may comprise a double pulley, i.e., a pulley with double seat which is adapted to engage a first and second traction members 15a, 15b (FIG. 4). The first traction member 15a has elongated form and is engaged, at one end, with the front portion 7a defined by the stem 14 of the arm 7 of the first device 5 and, at an opposite end, is engaged within a first seat of the double pulley: the first traction member 15a is configured to be wound around the pulley according to a first winding sense.

The second traction member 15b also has elongated form and is engaged, at one end, with the rear portion 7b defined by the stem 14 of the arm 7 of the first device 5 and, at an opposite end, is engaged within a second seat of the double pulley: the second traction member 15b is configured to be wound around the pulley according to a second winding sense opposite the first winding sense.

Due to the type of connection described above, following a movement of the stem 14 adapted to carry the front portion 7a of said arm 7 towards the rotation axis Z, the arm 7 of the first device 5 rotates the first wheel 15 driving the first traction member 15a. Following a movement of the stem 14 adapted to carry the front portion 7a of said arm away from the rotation axis Z, the arm 7 of the first device 5 rotates the first wheel 15 driving the second traction member 15b.

The first traction member 15a engaged directly with the arm 7 of the first device 5 may comprise at least one of: a chain, a rope, a belt. In the enclosed figures, in a non-limiting manner, a chain has been schematized. The second traction member 15b engaged directly with the arm 7 of the first device 5 may comprises at least one of: a chain, a rope, a belt. Also, for the second traction member, a chain has been illustrated in the enclosed figures, in a non-limiting manner.

If the arm 7 of the first device 5 is directly moved, it is the movement of the latter that rotate the first bar 41; in other words, by directly moving the first bar 41 it is possible to directly actuate the first or second traction member which rotates the first wheel 15 fit on the first bar 41 and, consequently, the first bar 41 itself. Actively acting on the rotation of the first bar 41, the latter allows the rotation of the wheel 15 which, due to the first or second traction member 15a, 15b, slidingly drive the arm 7 (towards or away from the axis Z).

The first bar 41, together with the wheel 15 and the first and second traction members 15a, 15b, defines a movement device 40 of the arm 7 allowing the extension-retraction of the latter.

The movement of the arm 7 of the first device 5 may be executed by different movement device 40. For example, the arm 7 could comprise a rack adapted to engage a toothed wheel fit on the first bar 41 to connect the first bar 41 with the arm 7 of the first device 5.

The tire changer apparatus 1 may comprise a second bar 42 configured to rotate around an axis Y" (FIGS. 6-8) parallel to the rotation axis Z: the rotation axis Y" of the second bar 42 may be also parallel to the rotation axis Y' of the first bar 41.

The second bar 42 is connected at least with the front portion 70a of the arm 70 of the second device 6. In fact, a movement of the front portion 70a of the arm 70 (e.g., a translation of the entire arm 70 towards or away from the rotation axis Z) corresponds with a rotation of the second bar 42. As is visible for example in FIG. 3, the second bar 42 is placed at the second column 4b, on the side of the guide 12 of the second column 4b (the guide 12 and the second bar are substantially parallel to each other); in detail, the guide 12 of the second column 4b is interposed between the first bar 42 and the ideal middle plane P. The second bar 42 is opposite the first bar 41 with respect to the ideal middle plane P; in detail, the distance between the first bar 41 and the ideal middle plane P is identical to a distance between said ideal middle plane P and said second bar 42.

Figure 6:
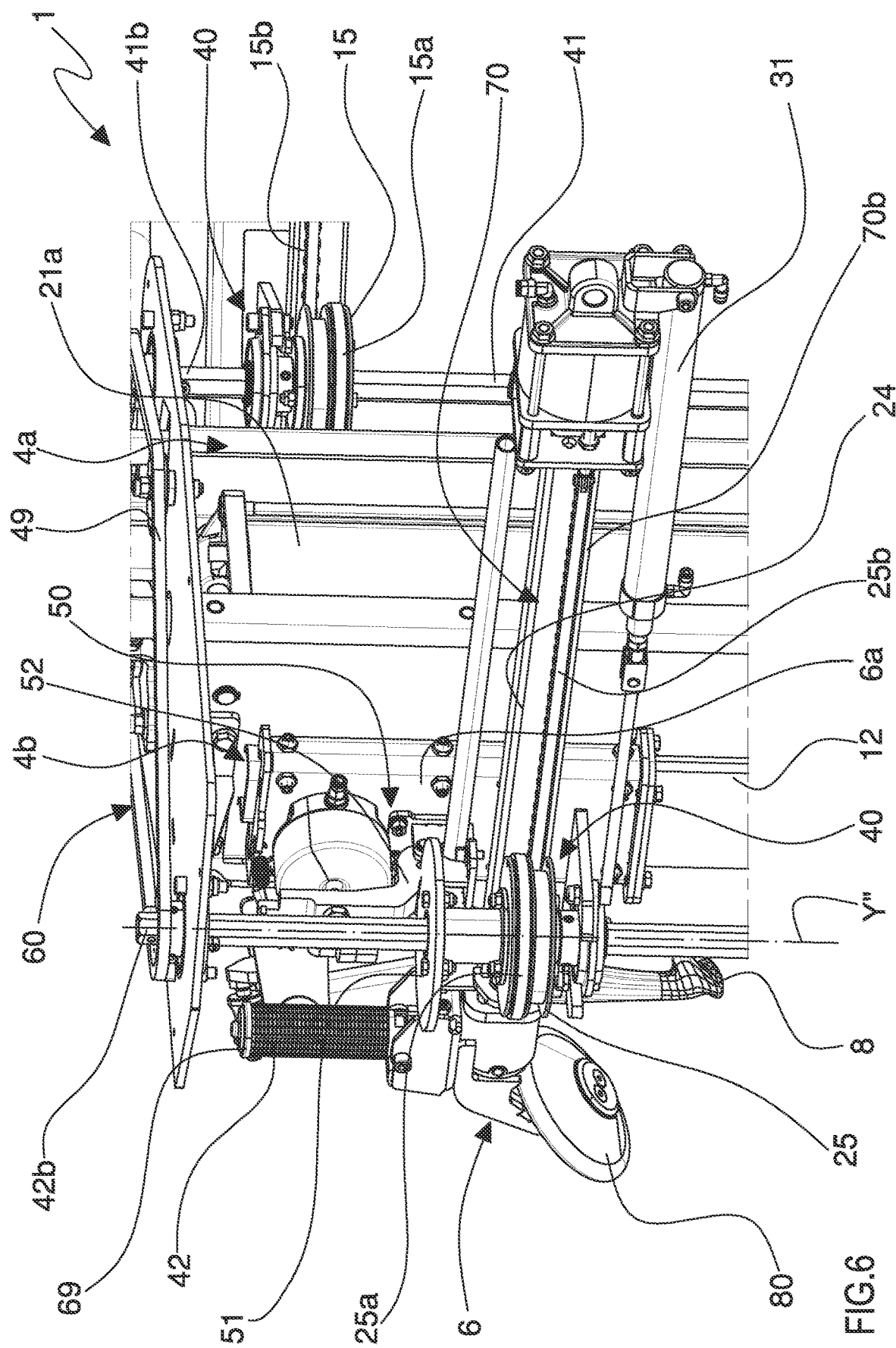
FIGS. 6-8, are detailed views of a second arm of a tire changer apparatus carrying a second tool, for example a bead breaker tool.

The second bar 42 may extend over the entire extension of the frame 4; in detail, the second bar 42 may extend between a first and a second end portion 42a, 42b: the first end portion 42a of the second bar 42 may be arranged at the bottom portion 40a of the frame 4 while the second end portion 42b of said second bar 42 may be arranged at the top portion 40b of the frame 4. The second bar 42 may extend height-wise over the entire height of the frame 4 starting from the base 2 up to the support plate 40c. As shown in FIG. 6, the second bar 42 may slightly emerge from the support plate 40c on the side opposite the base 2: at least one part of the second end portion 42b of the second bar 42 is arranged above the support plate 40c, i.e., on the side opposite the base 2 with respect to the support plate 40c.

The second bar 42 may have a polygonal shape, optionally hexagonal; the second bar 42 may have a constant section over the entire extension thereof between the first and the second end portion 42a, 42b. In fact, the first and the second bar 41, 42 may be identical to each other and arranged symmetrically with respect to the ideal middle plane P of the tire changer apparatus 1.

The connection between the arm 70 of the second device 6 and the second bar 42 may be obtained as schematically shown in the enclosed figures, i.e., by a second wheel 25 and a traction members. In detail, as illustrated in FIGS. 6-8, the tire changer apparatus 1 may comprise a second wheel 25 fit on the second bar 42 and integral in rotation with the latter; the second wheel 25 connects the second bar 42 with the stem 24 of the arm 70 of the second device 6: the second bar 42 is connected with the stem 24 of the arm 70 of the second device 6 such that a rotation of said second bar 42 corresponds with movement of said stem 24 via sliding within the sleeve 23.

Figure 7:
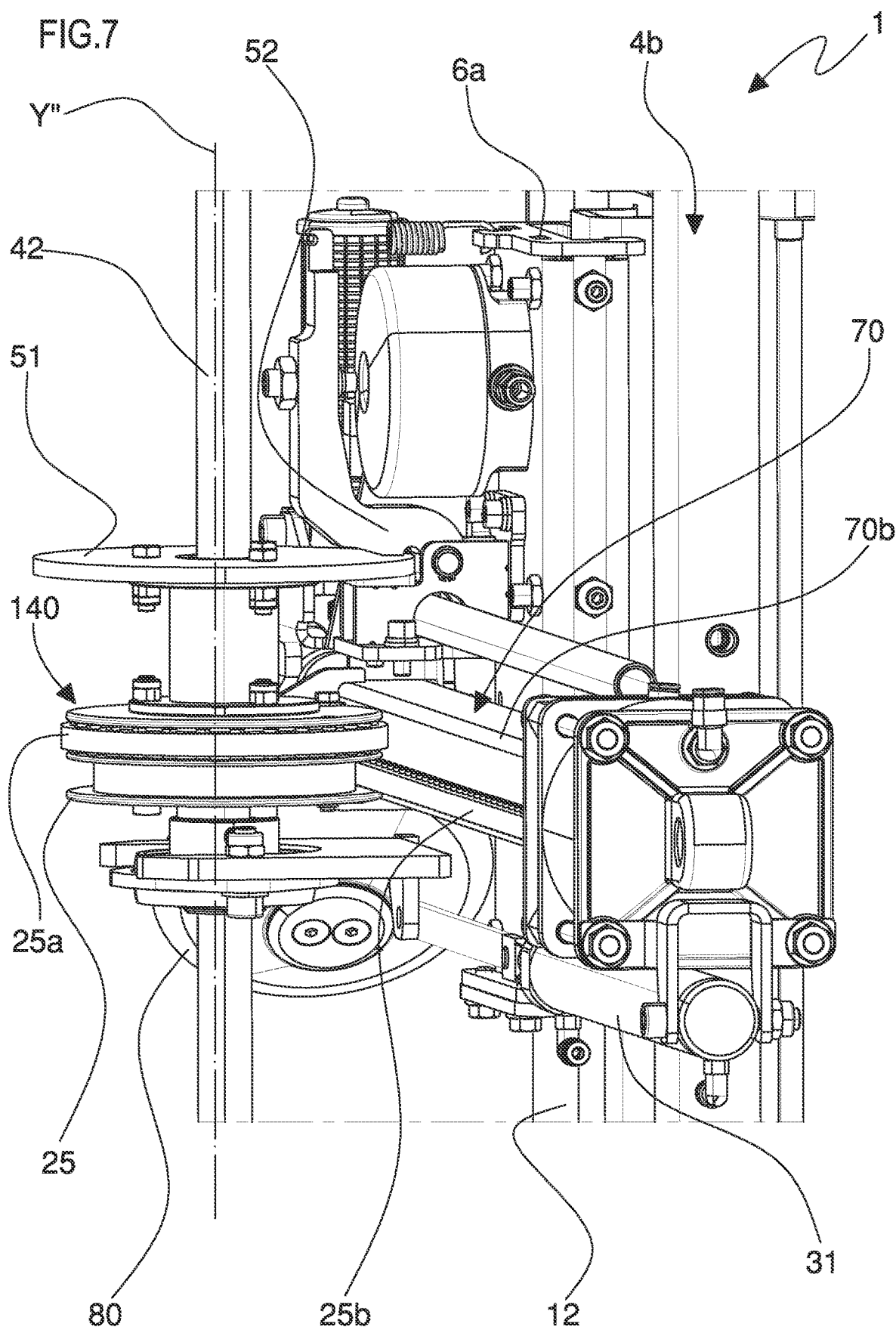
Figure 8:
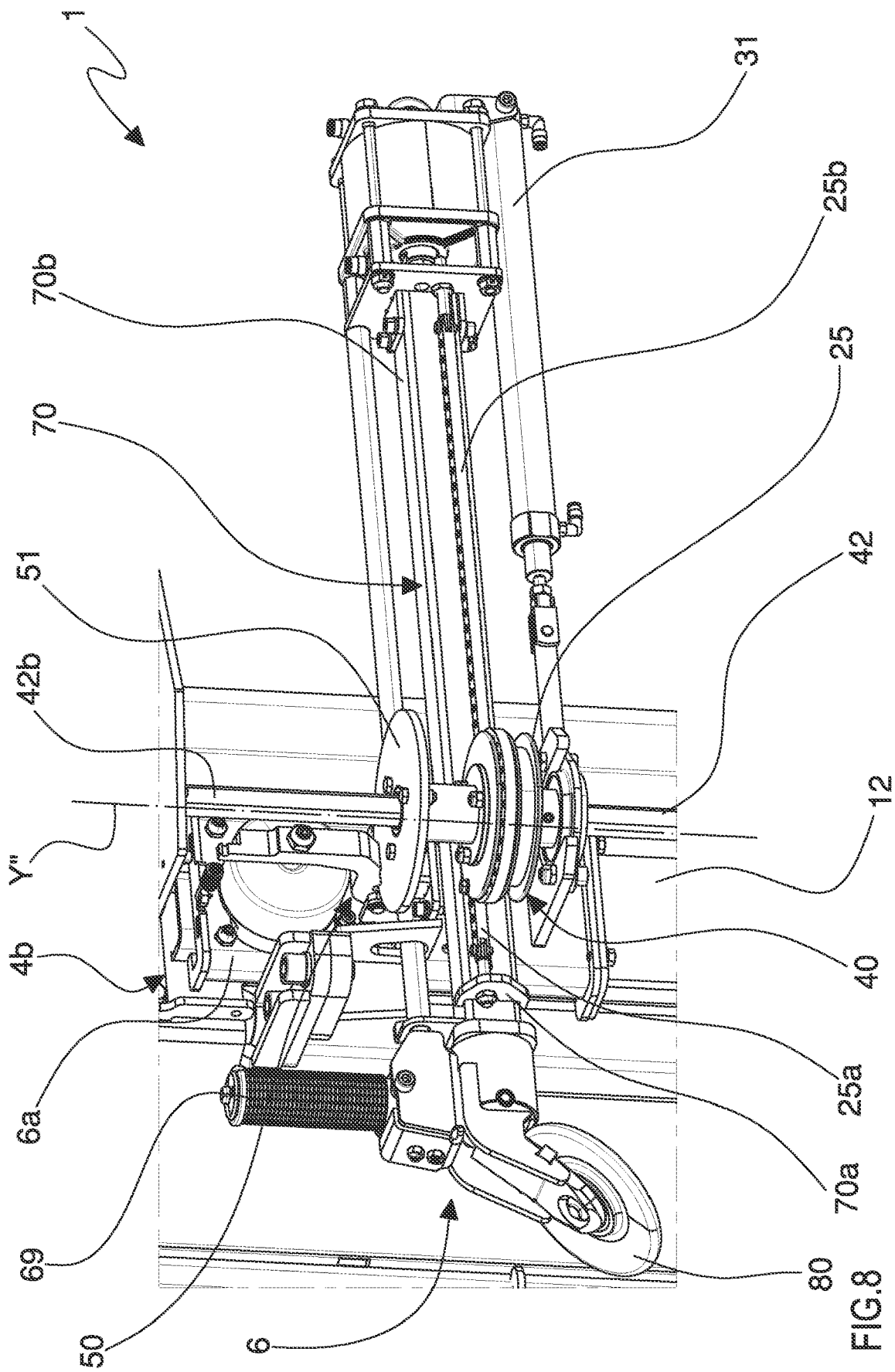

The second wheel 25 may comprise a double pulley i.e., a pulley with double seat which is adapted to engage at least one first and second traction member 25a, 25b (FIGS. 6-8). The first traction member 25a has elongated form and is engaged, at one end, with the front portion 70a defined by the stem 24 of the arm 70 of the second device 6 and, at an opposite end, is engaged within a first seat of the double pulley: the first traction member 25a is configured to be wound around the pulley according to a first winding sense.

The second traction member 25b also has elongated form and is engaged, at one end, with the rear portion 70b defined by the stem 24 of the arm 70 of the second device 6 and, at an opposite end, is engaged within a second seat of the double pulley: the second traction member 25b is configured to be wound around the pulley according to a second winding sense opposite the first winding sense.

Due to the above-described connection type, following a movement of the stem 24 adapted to carry the front portion 70a of said arm 70 towards the rotation axis Z, the arm 70 of the second device 6 rotates said second wheel 25 by a driving action of the first traction member 25a. Following a movement of the stem 24 adapted to carry the front portion 70a of said arm away from the rotation axis Z, the arm 70 of the second device 6 rotates said second wheel 25 by a driving action of the second traction member 25b.

The first traction member 25a engaged directly with the arm 70 of the second device 6 may comprise at least one of: a chain, a rope, a belt. In the enclosed figures, a chain is schematized in a non-limiting manner. The second traction member 25b engaged directly with the arm 70 of the second device 6 comprises at least one of: a chain, a rope, a belt. The second traction member, a chain was illustrated in the enclosed figures, in a non-limiting manner.

If the arm 70 of the second device 6 is directly moved, the latter rotate the second bar 42; in other words, by directly moving the second bar 42 it is possible to directly actuate the first or second traction member 25a, 25b which rotates the second wheel 25 fit on the second bar 42 and, consequently, the second bar 42 itself. Actively acting on the rotation of the second bar 42, the latter rotates the second wheel 25 which, due to the first or second traction member 25a, 25b slidingly drives the arm 70 (towards or away from the axis Z).

The second bar 42, together with the second wheel 25 and the first and second traction member 25a, 25b define a movement device 140 of the arm 70 adapted to allow the extension-retraction of the latter.

Different movement device 140 may be implemented. For example, the arm 70 may comprise a rack adapted to engage a toothed wheel fit on the second bar 42 to connect the second bar 42 with the arm 70 of the second device 6.

As is visible from the enclosed figures, the tire changer apparatus 1 comprises a transmission 60 which connects the first and the second bar 41, 42 to synchronize the movement of the front portions 7a, 70a of the first and second devices 5, 6 (in detail, the translation of the entire arms relative to the rotation axis Z). The transmission 60 connects the rotation movement of the first and second bars 41, 42 to synchronize the sliding movement of the arms 7, 70 of the first and second devices 5, 6. The transmission 60 defines a mechanical connection allowing to synchronize the movement of the tools 8, 80 of the first and second devices and render the position of the tool 8 dependent on the position of the tool 80 with respect to the rotation axis Z, and vice versa. In other words, the transmission 60 synchronizes the movement of the front portions 7a, 70a of the first and second devices 5, 6 (optionally the movement of the stems 14 and 24 of the arms 7 and 70) such that the distance between the tool 8 of the first device 5 and rotation axis Z is identical (at most different for a minimum extent on the order of 50 mm) to a distance between said rotation axis Z and the tool 80 of the second device 6.

The transmission 60 may be arranged in proximity of at least one of the bottom portion 40a and the top portion 40b of the frame 4. For example, the transmission 60 may be engaged with the first and the second bar 41, 42:
  at the first end portions 41a, 42a of said first and second bars 41, 42, and/or
  at the second end portions 41b, 42b of said first and second bars 41, 42.

Figure 11:
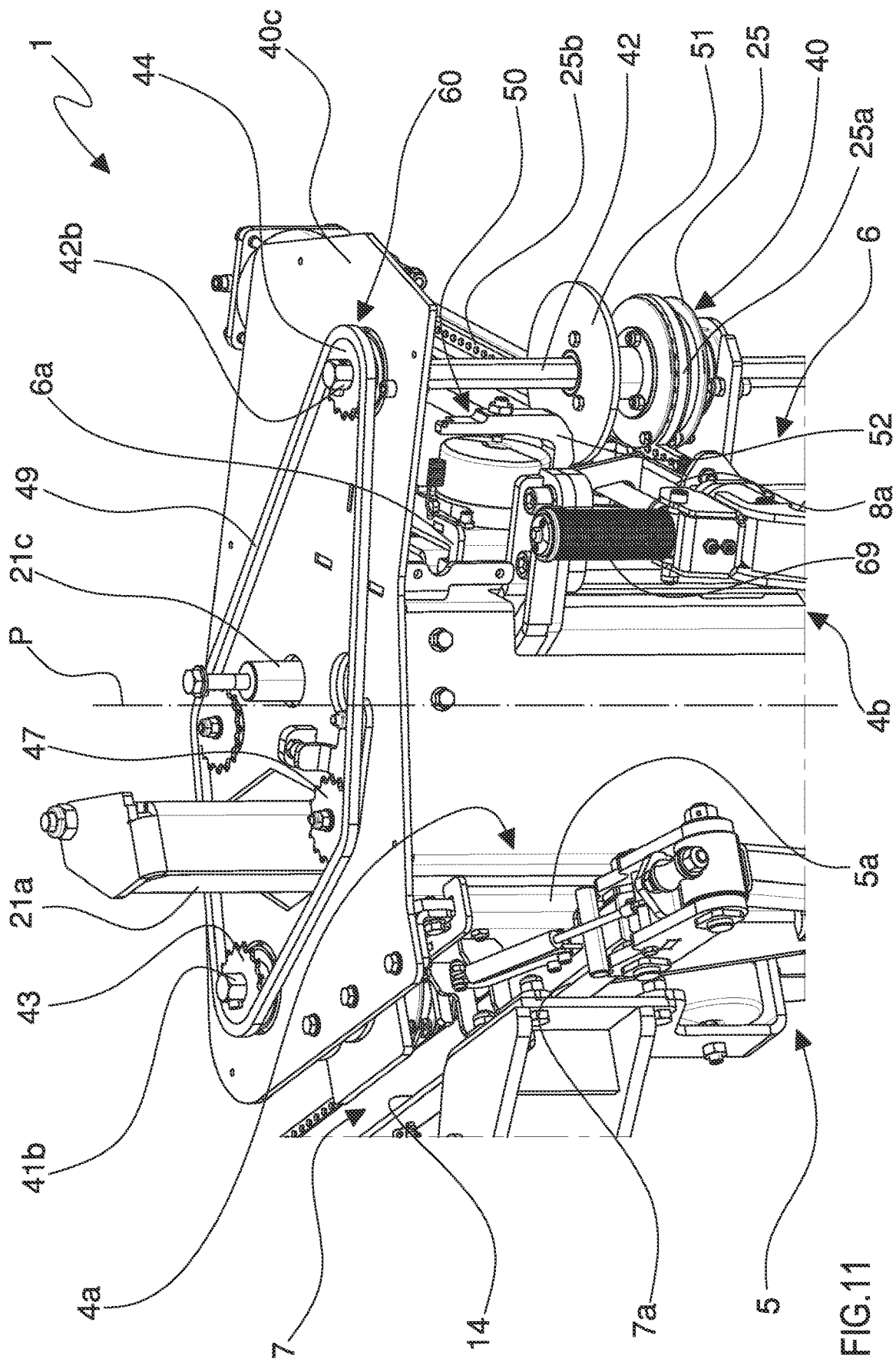

The enclosed figures show, in a non-limiting manner, a transmission 60 placed above the support plate 40c, i.e., placed on the side opposite the first and second devices 5, 6 with respect to said support plate 40c, engaged with the first and second bars 41, 42, at the second ends 41b, 42b of the latter (FIG. 11). In detail, the transmission 60 may comprise:
  a first transmission member 43 fit on the first bar 41,
  a second transmission member 44 fit on the second bar 42,
  a drive element 49 connecting said first and second transmission members 43, 44.

The first transmission member 43 may comprise at least one of: a toothed wheel, a crown, a friction wheel, a pulley. Similarly, the second transmission member 44 may comprise at least one of: a toothed wheel, a crown, a friction wheel, a pulley. The drive element 49 may instead comprise at least one of: a toothed wheel, a friction wheel, a chain, a belt, a rope.

The enclosed figures show, in a non-limiting manner, a transmission 60 comprising a first and second transmission members 43, 44 in toothed crown form which are adapted to cooperate with the drive element in chain form. Alternatively, the first and second transmission members 43, 44 may have toothed wheel form, which are adapted to cooperate with a drive element 49 in belt form, or in the form of a plurality of toothed wheels adapted to connect said first and second transmission members. As further alternative, the first and second transmission members 43, 44 may be in the form of pulleys or friction wheels adapted to cooperate with a drive element 49 in rope form or friction belt form. Of course, it is possible to have the engagement of a transmission 60 in any other form, capable of connecting the rotation of the first bar 41 with the rotation of the second bar 42.

If the driving member 49 comprises a rope, chain or belt, the transmission 60 may comprise an adjuster 47 (FIG. 10) in contact with the drive element 49, in interposition between the first and the second transmission members 43, 44: the adjuster 47 may be movable relative to at least one of said first and second transmission members 43, 44 to allow a tensioning adjustment of the drive element 49.

An extension or retraction movement (sliding towards or away from the rotation axis Z) of the arm 7 of the first device 5 rotates the first bar 41 which, due to the transmission 60 is transmitted to the second bar 42: the rotation of the second bar 42 is transmitted by the second wheel 25 to the arm 70 of the second device 6 which is moved with the arm 7, e.g., to the same extent towards or away from the rotation axis Z. Similarly, an extension or retraction movement (sliding towards or away from the rotation axis Z) of the arm 70 of the second device 6 rotates the second bar 42 which, due to the transmission 60, is transmitted to the first bar 41: the rotation of the first bar 41 is transmitted by the first wheel 15 to the arm 7 of the first device 5 which is moved with the arm 70, e.g., to the same extent towards or away from the rotation axis Z.

The arms 7, 70 of the first and second devices 5, 6 may be moved manually by an operator; the operator may therefore only act on one of said arms 7, 70 to position it in a desired work position, i.e. in a position in which the tool carried by the moved arm is adapted to act on the wheel (on the tire or on the rim of the wheel mounted on the wheelholder). The extension or retraction movement manually controlled by the operator on only one arm (7 or 70) is transferred from the transmission 60 to the arm (70 or 7).

The movement of the arms 7, 70 towards or away from the rotation axis Z may be executed by a translation actuators 31 active on at least one of said arms 7, 70. The translation actuator 31 may be an actuator of pneumatic or hydraulic type of an electric motor; such actuator 31 may act on at least one of said arms 7, 70 to allow the translation of the tool 8, 80 with respect to the rotation axis Z. In detail, the translation actuator 31 is active on at least one stem 14, 24 of the first and second devices 5, 6 to allow the movement of said stem towards or away from the rotation axis Z.

The enclosed figures illustrate, in a non-limiting manner, a tire changer apparatus 1 comprising a single translation actuator 31 directly active on the stem 24 of the arm 70 of the second device 6 (FIG. 6). The actuator 31 is configured to directly slidingly move the stem 24 within the sleeve 23 to move the tool 80 relative to the rotation axis Z. The movement imparted by the translation actuator 31 directly to the arm 70 of the second device 6 is indirectly transferred to the arm 7 of the first device 5 by the transmission 60. Due to the transmission 60, the translation actuator 31 acts substantially on both the arms 7, 70 (on one directly while on the other in an indirect manner due to the transmission) which are simultaneously moved towards and away from the rotation axis Z.

In the enclosed figures, a translation actuator 31 has been schematically illustrated whose activation is manually controlled by the operator by a servocontrol; on the second arm 70 there is a control lever 69 (servocontrol) adapted to activate the translation actuator 31 for the thrust or pull directly of the arm 70 of the second device 6. Nevertheless, a control unit connected to the translation actuator 31 and configured to control said translation actuator 31 may be present.

The tire changer apparatus 1 comprises a brake 50 configured to block the front portion 7a, 70a of at least one of the arms 7, 70 of the first and second devices 5, 6 so as to block the position of the tool 8, 80, e.g., the brake may block the tools in a condition in which these are configured to act on the wheel (on the tire and/or on the rim of the wheel). The tire changer apparatus 1 may comprise a single brake 50 adapted to block only one arm 7 or 70; due to the transmission 60, the blocking of only one arm allows to block the opposite arm. The enclosed figures illustrate, in a non-limiting manner, a brake 50 configured to block the arm 70 of the second device 6; such blocking action of the arm 70 is transferred by the transmission 60 to the arm 7 of the first device 5 which is consequently blocked. In fact, single brake 50 and transmission 60 allow blocking in movement both arms 7, 70 of the tire changer apparatus 1.

In detail, the brake 50 may comprise a disc 51 fit on the second bar 42 and a gripper 52 configured to act on the disc 51 to block the rotation thereof and thus block the rotation of the second bar 42 on which said disc 51 is fit. In fact, the brake 50 acts as rotation blocking element (directly of the second bar 42) whose blocking generates the consequent blocking of the arm 70 of the second device, which is not (when blocked) movable towards or away from the rotation axis Z: in the blocking condition the sliding of the stem 24 is blocked and the tool 80 is placed at a fixed distance from the rotation axis Z.

The single brake may act on at least one of:
- the first bar 41,
- the transmission 60, optionally on at least one of: the drive element 49, the first transmission member 43, the second transmission member 44,
- directly on the stem 14 of the arm of the first device 5,
- directly on the stem 24 of the second device 6.

Independent of the position of the single brake 50, it is possible to block both arms 7, 70 of the first and second devices 5, 6 due to the presence of the transmission 60 which, as specified above, connects the first and second bars 41, 42. In detail, any one blocking present on the kinematic chain between the first and second bars 41, 42 allows blocking the movement of both arms 7, 70 due to the presence of the connection created by the transmission 60.

The gripper 52 may be arranged in a normally closed configuration in which it grips on the disc 51 to block the rotation thereof; the opening of the gripper 52 may be managed by a servocontrol, for example by the same servocontrol (activated by the lever 69) adapted to control the activation of the translation actuator 31; the activation of the servocontrol allows activating the translation actuator 31 and simultaneously controlling the gripper 52 to release the disc 51. In this manner, simultaneous with the action of the actuation 31 and hence with the movement of the arms 7, 70 it is possible to control the opening of the gripper 52; following the 'turning off' of the servocontrol it is possible to stop the movement of the arms and consequently activate the brake 50 which allows blocking the arms 7, 70 in the stop position.

In detail, as shown in the enclosed figures, the first device 5 comprises a carriage 5a slidably movable along the guide 11 of the first column 4a along a direction parallel to the rotation axis Z; the carriage 5a is movable along said guide 11 of the first column 4a towards and away from the base 2. The carriage 5a of the first device 5 stably carries the arm 7 of the first device 5 itself: the carriage 5a of the first device 5 is fixed to the sleeve 13 of the first device 5. The guide 11 of the first column 4a and the carriage 5a of the first device 5 are engaged with each other by a constraint of sliding block type such that the arm 7 of the first device itself may maintain the same tilted position with respect to the ideal middle plane P.

The second device 6 comprises a respective carriage 6a slidably movable along the guide 12 of the second column 4b along a direction parallel to the rotation axis Z; the carriage 6a is movable along said guide 12 of the second column 4b towards and away from the base 2. The carriage 6a of the second device 6 stably carries the arm 70 of the second device 6 itself: the carriage 6a is fixed to the sleeve 13 of the second device 6 itself. The guide 12 of the second column 4b and the carriage 6a of the second device 6 are engaged with each other by a constraint of sliding block type such that the arm 70 of the second device itself may maintain the same tilted position with respect to the ideal middle plane P.

The movement of the carriages 5a, 6a of the first and second devices 5, 6 is managed by the lifting actuator. The lifting actuator may comprise the first and a second lifting actuator 21a, 21b (see FIG. 3) separate from each other and respectively active, in an independent manner, on the carriages 5a, 6a of the first and on the second device 5, 6. In detail, the first lifting actuator 21a is configured to directly move the carriage 5a of the first device 5 along the guide 11 of the first column 4a towards and away from the base 2 while the second lifting actuator 21b is configured to directly move the carriage 6a of the second device 6 along the guide 12 of the second column 4b towards and away from the base 2.

Due to the independent first and second lifters 21a, 21b, the tire changer apparatus 1 may independently control the height position of the tools 8 and 80 with respect to the base 2 and hence control which of said tools to place in contact with the wheel mounted on the wheel-holder.

Such lifting actuators may be servocontrolled or manually managed by an operator. Nevertheless, if a control unit is present, the latter may be control the first and second lifting actuator 21a, 21b; in detail, the control unit may be configured to independently control the lifting actuators 21a, 21b, so that the first and the second device 5, 6 may slide along the guides 11, 12 in an independent manner. For example, during the step of dismounting the tire, the control unit may control first lifting actuator 21a to move the first device 5 along the guide 11 such that said first device 5 may contact the tire and at the same time controlling to the second lifting actuator 21b to maintain the second device 6 in a lifted position in which the latter is spaced from the tire; then, the control unit may for example control the first lifting actuator 21a to move the first device 5 along the guide 11 away from the tire and simultaneously controlling the second lifting actuator 21b to move the second device 6 towards the tire such that said device 6 may come into contact with the tire itself.

The control unit may also be connected to an electric motor which power supplies the wheel-holder 3; the control unit may be configured to control the rotation of the shaft 3a of the wheel-holder 3 to allow a dismounting or mounting of the tire from/on the rim of a wheel.

The tools of the first and second devices 5, 6 may be equivalent to each other or have a different structure and function. The enclosed figures illustrate, in a non-limiting manner, a tool 8 of the first device 5 comprising a mount-dismount tool configured to be radially interposed between the first perimeter edge of the rim and the first bead of the tire to engage-disengage said first bead from the first perimeter edge of the rim.

The tool 80 of the second device 6 may then comprise a mount-dismount tool similar to that of the first device 5 or may comprise, as is illustrated in the enclosed figures, a pressure element configured for acting thrustingly on the first bead of the tire to allow at least one partial separation of said first bead from the first perimeter edge of the rim.

The pressure element comprises a rotary body defining, with the tire, a friction of rolling type; the rotary body is configured to rotate around an axis thereof in an operative condition in which the wheel rotates around the rotation axis Z aid the rotary body contacts the tire. The rotary body comprises at least one of: a disc, a cylinder, a sphere.

As is visible for example in FIG. 2, the tire changer apparatus may further comprise a third device 90 whose structure is similar to that of the second device 6; in fact, the third device 90 is defined by a further pressure element placed, in use conditions of the apparatus, below the second device 6 and adapted to act on the second bead of the tire to allow at least a partial separation of said second bead from the second perimeter edge of the rim.

In detail, the third device 90 comprises a arm 91 carried by the second column 4b and extended between a front portion 91a directed towards the rotation axis Z and an opposite rear portion 91b: said arm 91 of the third device 90 is configured to move at least said front portion 91a relative to the wheel-holder 3 to vary a distance between said front portion 91a of the arm 91 of the third device 90 and the rotation axis Z.

The third device 90 comprises a respective tool 92 terminally carried by the arm 91 at the front portion 91a and configured to operate on a rim and/or a tire of a wheel carried by the wheel-holder 3.

The third device 90 is aligned with the second device 6 according to a direction parallel to the rotation axis Z, optionally it is arranged, in a use condition of the apparatus 1, below said second device 6. The third device 90 is thus opposite the first device 5 with respect to the ideal middle plane P of the tire changer apparatus 1. The tool 92 of the third device 90 is thus opposite the tool 8 of the first device 5 (e.g., placed symmetrically) with respect to the ideal middle plane P.

The arm 91 of the third device extends between a front portion 91a directed towards the rotation axis Z and an opposite rear portion 91b; the arm 91 of the third device 90 is configured to move the front portion 91a relative to the wheel-holder 3 to vary a distance between said front portion 91a of the arm 91 and the rotation axis Z. At the front portion 91a, the arm 91 stably carries the tool 92.

The arm 91, identically to the above-described arms 7 and 70, is movable towards and away from the rotation axis Z such to move the tool 92 between a retreated position and an advanced position; the tool 92, in the retreated position, has a distance from the rotation axis Z greater than a distance present between said rotation axis Z and said tool 92 when arranged in the advanced position. The tool 92 of the third device 90, in the retreated position, may have a distance from the ideal middle plane P greater than a distance present between said ideal middle plane P and said tool 92 of the third device 90 when arranged in the advanced position. In detail, the tool 92, in the retreated position, has a distance from the ideal middle plane P substantially comprised between 80 mm and 300 mm, optionally between 100 mm and 200 mm, while, in the advanced position, the same tool 80 has a distance from the ideal middle plane P comprised between 30 mm and 200 mm, optionally between 50 mm and 100 mm. In detail, the tool 92 of the third device 90 is configured for being arranged at a distance from the ideal middle plane P and from the rotation axis Z identical to a distance present between the latter and the tool 80 of the second device.

As mentioned above, the third device is placed opposite the first device 5 with respect to the ideal middle plane P and aligned with the second device with respect to a direction parallel to the rotation axis Z; therefore, also the arms 7, 91 and the tools 8, 92 of said first and third device are opposite each other with respect to said ideal middle plane P.

Even if the arm 91 is movable towards and away from the rotation axis Z, the tool 92 of the third device 90 is configured to maintain a distance from said ideal middle plane P and thus remain, with respect to said ideal middle plane P, always on the same side on which the guide 12 of the second column 4b is present: the arm 91 of the third device 90 does not intersect the ideal middle plane P.

The arm 91 of the third device 90 extends, in a non-limiting manner, along an extension direction substantially rectilinear lying on a plane orthogonal to the rotation axis Z; arm 91 having different shape and size may be used. The extension direction of the arm 91 may define a tilt angle with the ideal middle plane P.

The extension direction of the arm 91 of the third device 90 is tilted with respect to the ideal middle plane P by an angle comprised between 10° and 30°, still more optionally comprised between 15° and 25°. Such tilt is fixed: the arm 91 does not rotate/tilt with respect to the ideal middle plane P.

The tilt position of the arm 91 allows to arrange the extension direction of the same arm 91 in intersection with the rotation axis Z; in this manner, also following the movement of the arm 91 towards or away from the rotation axis Z, the extension direction of the arm 91 intersects the rotation axis Z.

In detail, the tilt of the arm 91 of the third device 90 with respect to the ideal middle plane P is identical to the tilt of the arm 70 of the second device 6 with respect to said ideal middle plane P.

The arm 91 of the third device 90 has, in a non-limiting manner, a structure similar to that of the arm 70 of the second device 6. In detail, the arm 91 may comprise a sleeve having a seat, a stem slidably engaged within the seat of the sleeve: the stem defines the rear portion 91*b* and the front portion 91*a* of the arm of the third device 90. The stem of the arm 91 is entirely movable with respect to the rotation axis Z such that the entire stem (both the front portion 91*a* and the rear portion 91*b* defined by the stem itself) is movable towards and away from said rotation axis Z.

In fact, also the arm 91 of the third device 90 is of extensible type and hence able to vary the distance thereof with respect to the rotation axis Z to adapt the position of the tool 92 as a function of the size of the wheel mounted on the wheel-holder 3.

The movement of the arm 91 of the third device 90 occurs identically with the movement of the second device by the second bar 42. In fact, the second bar 42 is connected with the front portion 91*a* of the arm 91 of the third device 90 such that a movement of the front portion 91*a* of the arm 91 (e.g., a translation of the entire arm 91 towards or away from the rotation axis Z) corresponds with a rotation of the second bar 42.

The connection between the arm 91 of the third device 90 and the second bar 42 may be obtained as illustrated in the enclosed figures, i.e., by a third wheel 35 and a traction members. In detail, as illustrated in FIG. 9, the tire changer apparatus 1 may comprise a third wheel 35 fit on the second bar 42 and integral in rotation with the latter; the third wheel 35 connects the second bar 42 with the stem of the arm 91 of the third device 90: the second bar 42 connects the stem of the arm 91 of the third device 90 such that a rotation of said second bar 42 corresponds with movement of said stem via sliding within the sleeve of the third device 90.

Figure 9:
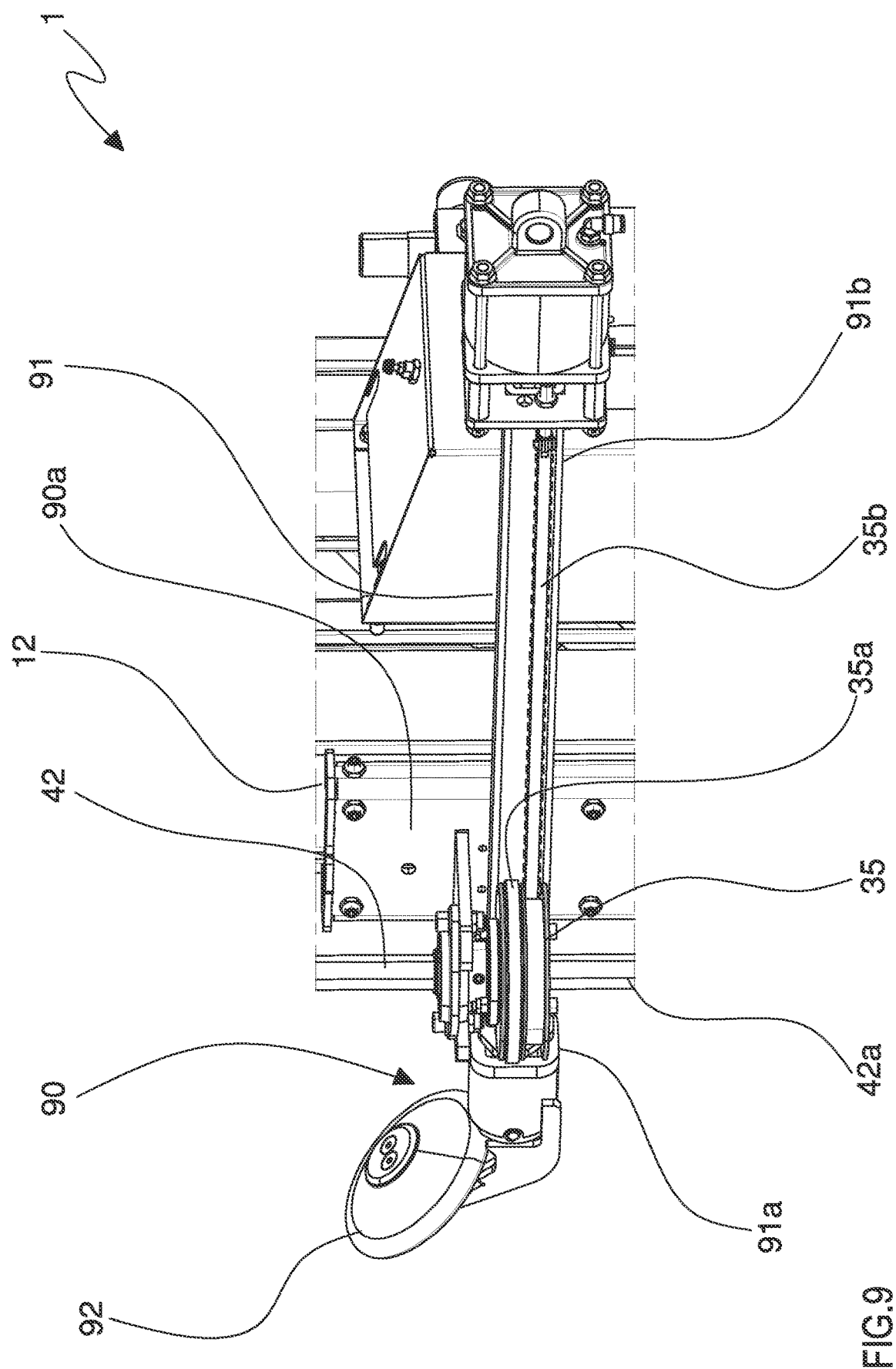
FIG. 9 shows a third arm of a tire changer apparatus carrying a third tool, for example comprising a bead breaker tool.
Figure 10:
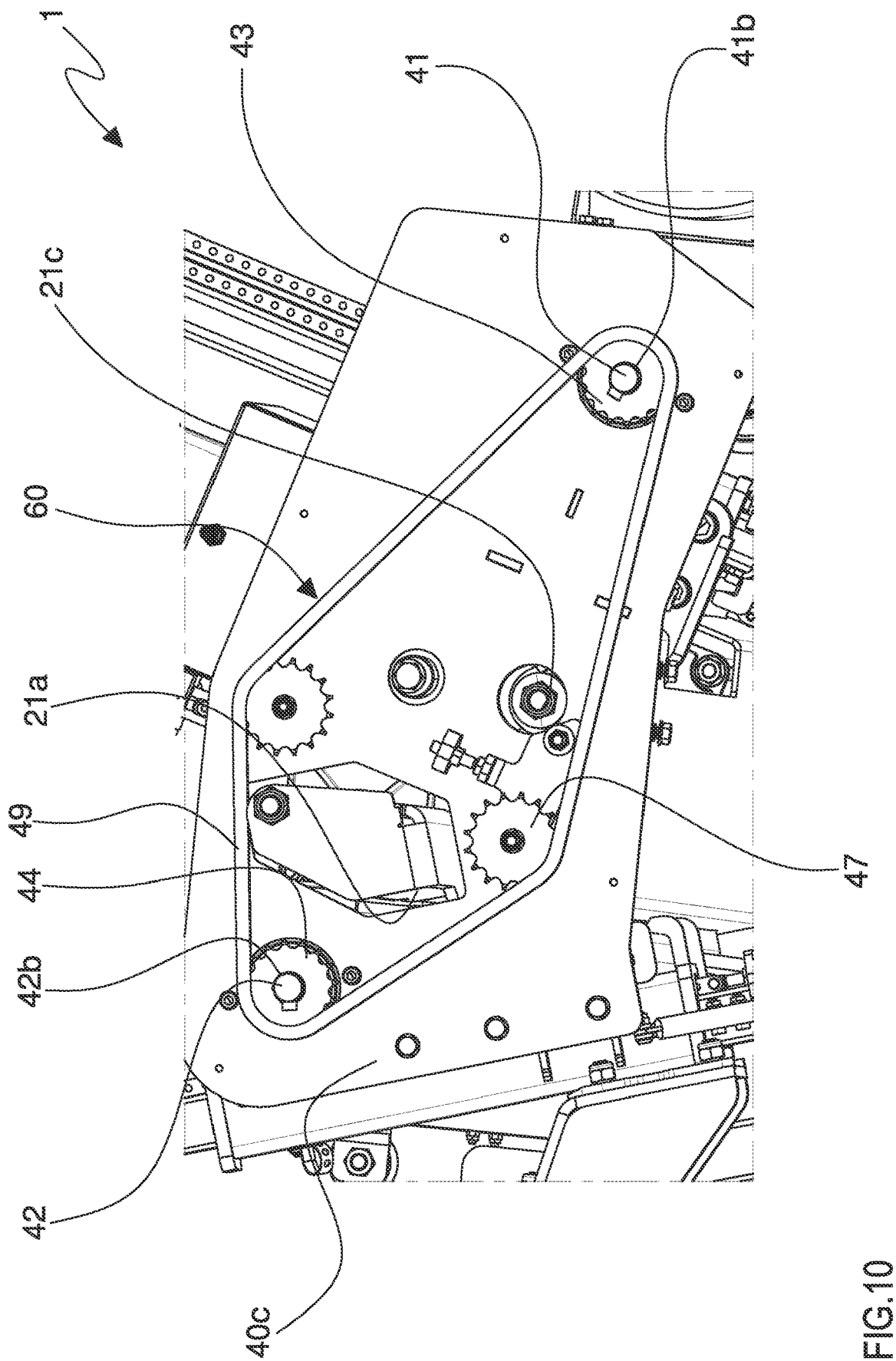
FIGS. 10 and 11 are detailed views of a transmission of a tire changer apparatus.

The third wheel 35 may comprise a double pulley i.e., a pulley with double seat which is adapted to engage at least one first and second traction member 35*a*, 35*b* (FIG. 9). The first traction member 35*a* has elongated form and is engaged, at one end, with the front portion 91*a* defined by the stem of the arm 91 of the third device 90 and, at an opposite end, is engaged within a first seat of the double pulley: the first traction member 35*a* is configured to be wound around the pulley according to a first winding sense.

The second traction member 35*b* has elongated form and is engaged, at one end, with the rear portion 91*b* defined by the stem of the arm 91 of the third device 90 and, at an opposite end, is engaged within a second seat of the double pulley: the second traction member 35*b* is configured to be wound around the pulley according to a second winding sense opposite the first winding sense.

Due to the above-described connection type, following a movement of the stem of the third device 90 adapted to carry the front portion 91*a* of said arm 91 towards the rotation axis Z, the arm 91 of the third device 90 rotate said third wheel 35 by a driving action of the first traction member 35*a*. Additionally, following a movement of the stem of the third device adapted to carry the front portion 91*a* of said arm 91 away from the rotation axis Z, the arm 91 of the third device 90 rotate said third wheel 35 by a driving action of the second traction member 35*b*.

The first traction member 35*a* engaged directly with the arm 91 may comprise at least one of: a chain, a rope, a belt. In the enclosed figures, a chain is schematized in a non-limiting manner. Additionally, the second traction member 35*b* engaged directly with the arm 91 comprises at least one of: a chain, a rope, a belt. Also, for the second traction member, a chain has been illustrated in the enclosed figures, in a non-limiting manner.

If the arm 91 of the third device 90 is moved directly, the latter rotates the second bar 42; in other words, by directly moving the second bar 42 it is possible to directly actuate the first or second traction member 35*a*, 35*b* which rotate the third wheel 35 fit on the second bar 42 and, consequently, the second bar 42 itself. Actively acting on the rotation of the second bar 42, the latter rotates the third wheel 35 which, due to the first or second traction member 35*a*, 35*b* slidingly driving the arm 91 (towards or away from the axis Z).

The second bar 42, together with the third wheel 35 and the first and second traction members 35*a*, 35*b*, defines a moving device of the arm 91 adapted to allow the extension-retraction of the latter.

Different movement device may be used. For example, the arm 91 may comprise a rack adapted to engage a toothed wheel fit on the second bar 42 to connect the second bar 42 with the arm 91.

Nevertheless, the second wheel 25 of the second device 6 and the third wheel 35 of the third device 90 are both fit on the second bar 42; a movement of the second bar thus corresponds with a simultaneous movement of the arms 70 and 91 of the second and third devices and consequently, due to the transmission 60, a movement of the arm 7 of the first device 5.

The single brake 50, by acting on the rotation of the second bar 42, may block the movement of the arm of the third device 90. In fact, due to the above-described structure of the apparatus 1 it is possible to provide for a single translation actuator 31 and a single brake 50 to move and block, in a synchronized manner, all the arms 7, 70, 91 of the first, second and third devices.

Even if engaged with the same track of the guide 12 of the second column 4*b*, the second and third devices 6, 90 are separate from each other and independent in movement along said guide 12. In fact, the third device 90 is spaced from the second device 6 along said guide 12: the second device 6 is placed at a distance from the base 2 greater than a distance between said base and the third device 90. The axial movement of the third device 90 is generated by a third lifting actuator 21*c* which acts on a carriage 90*a* of the third device slidably engaged along the track of the guide 12; the third actuator 21*c* (FIG. 3) is separate and independent from the first and second lifting actuator 21*a*, 21*b*.

As mentioned above, the tire changer apparatus 1 may lack any one electronic control and be manually controlled by the operator, for example by servocontrols. Alternatively, the tire changer apparatus 1 may comprise a control unit which controls the translation actuator 31 to move the front portion of the arms (of the arms 7 and 70 of the first and second devices 5, 6 and optionally of the arm 91 if the third device 90 is present) of the tire changer apparatus relative to the rotation axis Z. For example, the control unit may be configured to:
receive, in input, at least one signal representative of a characteristic of a wheel,
as a function of said representative signal, control the translation actuator 31 to move at least the front portion of the arms, hence the tools carried by said arms, into a pre-established work position.

The control unit may be configured to receive, in input, said representative signal by at least one of:
a manual insertion by an operator of a parameter representative of said characteristic of a wheel,
a measurement executed by a sensor connected to the control unit and configured to emit said signal representative of a characteristic of a wheel.

The control unit, following the extension movement of the arms relative to the rotation axis Z, may also be configured to control the lifting actuator (at least one of the first, second and third lifting actuators in an independent manner) to move at least devices 5, 6, 90 (at least one of the first, second and third devices) along a direction substantially parallel to the rotation axis Z.

Figure 5:
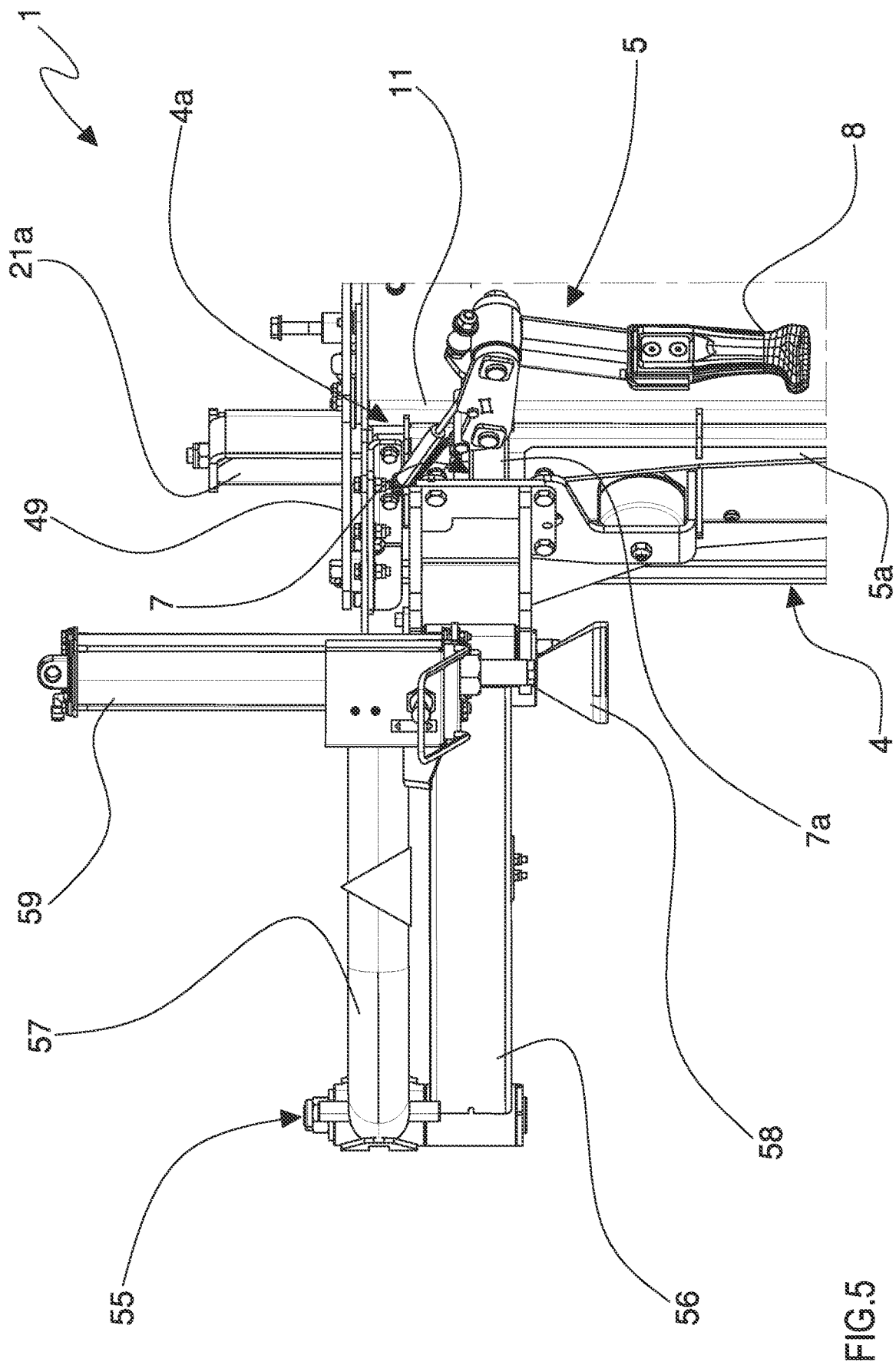

As is visible from the enclosed figures, the tire changer apparatus 1 may also comprise a traction-point tool 55 stably carried by the carriage 5a of the first device (FIGS. 1 and 5). The traction-point tool 55 may be of standard type, i.e., hinged to the carriage 5a and having a first and a second lever 56, 57 respectively hinged together to define an articulated arm; at one end of the second lever, opposite the first lever, said second lever supports a pressure tool 58. The pressure tool 58 may nevertheless be directly carried by an actuator 59 which is directly connected to the second lever 57. The actuator 59 may be of pneumatic, hydraulic or electric type and be controlled by a servocontrol: the actuator 59 is configured for moving the pressure tool 58 along a direction parallel to the rotation axis Z.

Dismounting Process

The present invention further concerns a process of dismounting a tire from a rim by the tire changer apparatus in accordance with the above-reported description and/or in accordance with the enclosed claims.

The dismounting process initially provides for a step of positioning the wheel on the wheel-holder 3. Then, the process provides for inflating the tire, such that the same may be separated from the rim and subsequently removed. Subsequently, the process provides for the movement of the arms 7, 70 of the first and second devices 5, 6—and if present of the third device 90—towards or away from the rotation axis Z such that the respective tools may operate on the rim and/or tire of the wheel carried by the wheel-holder 3. The step of moving the arms 7, 70 of the first and second devices 5, 6—and if present of the third device 90—towards or away from the axis Z is synchronized by the transmission 60. Subsequently, the wheel mounted on the wheel-holder 3 is made to rotate around the axis Z thereof; then, the tool 80 of the second device 6 is pressed on the first bead of the tire by the movement of the carriage 6a towards the wheel-holder 3 along the guide 12 of the second column 4b, such that the tool 80 may generate a separation of the first bead from the first perimeter edge of the rim. If the third device 90 is present, the process also provides for, preferably simultaneously with the step of pressing the first bead, a step of pressing the second bead the tool 92 of the third device 90, to generate a separation of the second bead from the second perimeter edge of the rim. The tool is pressed on the second bead by movement of the carriage 90a along the guide 12 of the second column 4b towards the second device 6.

Following the separation of the first bead from the first edge of the rim, the process provides for interrupting the rotation of the wheel by blocking the wheel-holder 3 and the subsequent radial interposition of the tool 8 of the first device 5 between said first bead and the first perimeter edge of the rim; the radial interposition of the tool 8 of the first device 5 between said first bead and the edge of the rim provides for the movement of the first device 5 along the guide 11 of the first column 4a towards the wheel. During the radial interposition of the tool 8 between said first bead and the edge of the rim, the process may provide for the movement of the carriage 5a away from the wheel-holder 3 such that the tool 8 may extract at least part of the first bead from the first perimeter edge of the rim.

Following the partial extraction of the first bead from the first perimeter edge of the rim and during the radial interposition of the tool 8 between said first bead and the first perimeter edge of the rim, the process provides for the rotation of the wheel around the axis Z to completely disengage the first bead from the first perimeter edge of the rim. During the radial interposition of the tool 8 between said first bead and the edge of the rim, the second device 6 (if the third device is also present), is moved away from the wheel by the movement of the carriage 6a (also by the carriage 90a if the third device is present) itself along the guide 12 of the second column 4b. Following the complete disengagement of the first bead from the first perimeter edge of the rim, the process comprises the following steps:
stopping the rotation of the wheel around the rotation axis Z thereof,
at least partly placing the second bead of the tire in contact with the first perimeter edge of the rim,
following the contact of the second bead of the tire with the first perimeter edge of the rim, radially interposing the tool 92 of the third device 90 between said second bead and the first perimeter edge of the rim to allow said tool 92 to extract at least part of the second bead from the first perimeter edge of the rim,
following the partial extraction of the second bead from the first perimeter edge of the rim and during the radial interposition of the tool of the third device between said second bead and the first perimeter edge of the rim, rotating the wheel around the rotation axis Z to completely disengage the tire from the rim.

Mounting Process

The present invention further concerns a process of mounting a tire on a rim by the tire changer apparatus 1 in accordance with the above-reported description and/or in accordance with the enclosed claims. The mounting process initially provides for a step of mounting the rim of the wheel on the wheel-holder 3. Then, the process provides for the synchronized movement of the arms 7, 70 of the first and second devices 5, 6—and if present of the third device 90—such that the respective tools may operate on the rim and/or tire of the wheel carried by the wheel-holder 3. The step of moving the arms 7, 70 of the first and second devices 5, 6—and if present of the third device 90—is synchronized by the transmission 60 which allows the movement simultaneously of all the tools into a work position.

Following the correct positioning of the tools of the first, second and optionally the third device, the process provides for the positioning of the tire on the rim mounted on the wheel-holder 3; the tire is abutted on the rim such that the second bead of the tire is abutted against the first perimeter edge of the rim. Then, the process provides for the radial interposition of the tool of the second or third device between the second bead of the tire and the first perimeter edge of the rim. Subsequently, due to said tools, the engagement is executed of a part of the second bead with the first perimeter edge of the rim. Alternatively, the engagement of the bead may be carried out due to the use of a shaped tool which allows inserting at least part of the first bead by the movement, towards the wheel, of the tool.

Following the partial engagement of the second bead with the first perimeter edge of the rim and during the radial interposition of the tool between said second bead and the first perimeter edge of the rim, the process provides for the rotation of the wheel around the axis Z to completely engage the second bead with the first perimeter edge of the rim: following the complete engagement of the second bead with the first perimeter edge of the rim, the second bead is interposed between the first and the second perimeter edge of the rim.

Then, the second bead is arranged at the second perimeter edge of the rim and the first bead is placed at the first perimeter edge of the rim. Subsequently, the process provides for the execution of a pressure on the first bead of the tire, by the tool 80, of the second device 6: in such step, the carriage 6a is made to slide along the guide 12 of the second column 4b such that the tool 80 may be moved close towards the second bead of the tire up to the partial engagement of the first bead with the first perimeter edge of the rim.

Following the partial engagement of the first bead with the first perimeter edge of the rim and during the action of pressing the tool 80 of the second device 6 on the first bead, the process provides for rotating the wheel around the axis Z to completely engage the first bead with the first perimeter edge of the rim: following the complete engagement of the first bead with the first perimeter edge of the rim, the first and second beads are both interposed between the first and second perimeter edges of the rim.

It is therefore possible to move the tools of the first and second devices—and if present of the third device—away from the wheel by axial sliding along the respective guides 11 and 12 away from the wheel. It is therefore possible to disengage the wheel from the wheel-holder 3 and inflate the tire. The step of inflating the wheel may at any rate be executed immediately after the insertion of the tire in the seat of the rim and hence before the disengagement of the wheel from the wheel-holder 3.

What is claimed is:

1. A tire changer apparatus for mounting and/or dismounting of a tire from a rim of a wheel of a vehicle, said tire changer apparatus comprising:
    a base,
    a wheel-holder engaged with the base and configured to put in rotation, around a rotation axis, a wheel of a vehicle,
    a frame comprising a first and a second column emerging from the base along a direction parallel to the rotation axis,
    a first device comprising:
        an arm carried by the first column, wherein said arm of the first device extends between a front portion directed towards the rotation axis and an opposite rear portion, wherein said arm of the first device is configured to move at least said front portion relative to the wheel-holder to vary a distance between said front portion of the arm of the first device and the rotation axis, and
        a tool terminally carried by said arm at the front portion and configured to operate on at least one of a rim and a tire of a wheel carried by the wheel-holder,
    a second device comprising:
        an arm carried by the second column, wherein said arm of the second device extends between a front portion directed towards the rotation axis and an opposite rear portion, wherein said arm of the second device is configured to move at least said front portion relative to the wheel-holder to vary a distance between said front portion of the arm of the second device and the rotation axis, and
        a tool terminally carried by said arm of the second device at the front portion and configured to operate on at least one of a rim and a tire of a wheel carried by the wheel-holder,
    a first bar placed at the first column and configured to rotate around an axis parallel to the rotation axis, said first bar being connected at least with the front portion of the arm of the first device,
    a second bar placed at the second column and configured to rotate around a respective axis parallel to the rotation axis, said second bar being connected at least to the front portion of the arm of the second device, and
    a transmission which connects the first and the second bar to synchronize movement of the front portion of the first and second devices, wherein the transmission comprise:
        a first transmission member on the first bar,
        a second transmission member on the second bar, and
        a drive element connecting said first and second transmission members; and
    wherein
        the first transmission member comprises at least one of a toothed wheel and a crown,
        the second transmission member comprises at least one of a toothed wheel and a crown, and
        the drive element comprises at least one of a toothed wheel, a chain, and a belt.

2. The tire changer apparatus according to claim 1, wherein the frame extends between a bottom portion placed at the base and a top portion opposite the bottom portion, wherein the transmission is arranged at the top portion of the frame.

3. The tire changer apparatus of claim 1, wherein the first and the second column are opposite each other with respect to an ideal middle plane of the tire changer apparatus parallel to the rotation axis, wherein said tool of the second device is opposite the tool of the first device with respect to the ideal middle plane of the tire changer apparatus.

4. A tire changer apparatus for mounting and/or dismounting of a tire from a rim of a wheel of a vehicle, said tire changer apparatus comprising:
    a base,
    a wheel-holder engaged with the base and configured to put in rotation, around a rotation axis, a wheel of a vehicle,
    a frame comprising a first and second column emerging from the base along a direction parallel to the rotation axis,
    a first device comprising:

an arm carried by the first column, wherein said arm of the first device extends between a front portion directed towards the rotation axis and an opposite rear portion, wherein said arm of the first device is configured to move at least said front portion relative to the wheel-holder to vary a distance between said front portion of the arm of the first device and the rotation axis, and a tool terminally carried by said arm at the front portion and configured to operate on at least one of a rim and a tire of a wheel carried by the wheel-holder, a second device comprising:
an arm carried by the second column, wherein said arm of the second device extends between a front portion directed towards the rotation axis and an opposite rear portion, wherein said arm of the second device is configured to move at least said front portion relative to the wheel-holder to vary a distance between said front portion of the arm of the second device and the rotation axis, and a tool terminally carried by said arm of the second device at the front portion and configured to operate on at least one of a rim and a tire of a wheel carried by the wheel-holder, and a first bar configured to rotate around an axis parallel to the rotation axis, said first bar being connected at least with the front portion of the arm of the first device, wherein the first and the second columns are opposite each other with respect to an ideal middle plane of the tire changer apparatus parallel to the rotation axis, wherein said tool of the second device is opposite the tool of the first device with respect to the ideal middle plane of the tire changer apparatus, wherein the tire changer apparatus further comprises:
a second bar configured to rotate around a respective axis parallel to the rotation axis, said second bar being connected at least to the front portion of the arm of the second device, and a transmission which connects the first and the second bar to synchronize the movement of the front portions of the first and second devices;

wherein the tire changer apparatus further comprises a brake configured to directly block the movement of the front portion of only one arm of the first and second devices, and wherein the transmission, by connecting the first and the second bar, blocks the movement of the other arm of the first and second devices when the brake blocks the movement of the front portion of the only one arm.

5. The tire changer apparatus according to claim 4, wherein the first bar is placed at the first column while the second bar is placed at the second column, opposite the first bar with respect to the ideal middle plane.

6. The tire changer apparatus according to claim 4, wherein the frame extends between a bottom portion placed at the base and a top portion opposite the bottom portion, wherein the first bar extends between a first and a second end portion, wherein the first end portion of the first bar is arranged at the bottom portion of the frame while the second end portion of said first bar is placed at the top portion of the frame, wherein the second bar extends between a respective first and a second end portion, wherein the first end portion of the second bar is arranged at the bottom portion of the frame while the second end portion of said second bar is placed at the top portion of the frame, and wherein the transmission is engaged with the first and second bars in proximity of at least one of:
at the first end portions of said first and second bars, and
at the second end portions of said first and second bars.

7. The tire changer apparatus according to claim 4, wherein the transmission is configured to synchronize the movement of the front portions of the first and second devices such that the distance between the tool of the first device and the rotation axis is identical to a distance between said rotation axis and the tool of the second device.

8. The tire changer apparatus according to claim 4, wherein the transmission comprises:
a first transmission member on the first bar,
a second transmission member on the second bar, and
a drive element connecting said first and second transmission members.

9. The tire changer apparatus according to claim 8, wherein:
the first transmission member comprises at least one of a toothed wheel and a crown,
the second transmission member comprises at least one of a toothed wheel and a crown, and
the drive element comprises at least one of a toothed wheel, a chain, a belt.

10. The tire changer apparatus according to claim 4, wherein the frame comprises, at a top portion opposite the base, a support plate which engages the transmission, wherein the transmission is opposite the first and second devices with respect to the support plate of the frame.

11. The tire changer apparatus according to claim 4, wherein the arm of the first device extends along an extension direction lying on a plane orthogonal to the rotation axis, wherein the extension direction of the arm of the first device is tilted with respect to the ideal middle plane by an angle comprised between 10° and 30°, and
wherein the arm of the second device extends along a predetermined extension direction lying on a plane orthogonal to the rotation axis, wherein the extension direction of the arm of the second device is tilted with respect to the ideal middle plane by an angle comprised between 10° and 30°.

12. The tire changer apparatus according to claim 11, wherein the tilt of the arms, respectively of the first and second devices, is fixed with respect to the ideal middle plane.

13. The tire changer apparatus according to claim 4, wherein the arm of the first device comprises:
a sleeve having a seat, and
a stem slidably engaged within the seat of the sleeve, wherein the stem defines the rear and the front portions of said arm of the first device, wherein the tool of the first device is carried by said stem,
wherein the first bar is connected with the stem of the arm of the first device such that a rotation of said first bar corresponds to a movement of said stem, wherein the tire changer apparatus comprises a first wheel fit on the first bar and integral in rotation with the latter, wherein said first wheel is configured to connect the first bar with the stem of the arm of the first device,
wherein the arm of the second device comprises:
a sleeve having a seat, and
a stem slidably engaged within the seat of said sleeve, wherein the stem of the second device defines the rear portion and the front portion of said arm of the second device, wherein the tool of the second device is carried by said stem of the same second device, wherein the second bar is connected with the stem of the arm of the second device such that a rotation of said second bar corresponds to a movement of said stem of the same second device, and wherein the tire changer apparatus comprises a second wheel rotationally fixed to the second bar, wherein said second wheel is configured to connect the second bar with the stem of the arm of the second device.

14. The tire changer apparatus according to claim 13 comprising a translation actuator active on a stem of at least one of the first and second devices to move said stem towards or away from the rotation axis.

15. The tire changer apparatus according to claim 13 comprising a single translation actuator directly active on the stem of the second device to slidably move said stem within the seat of the sleeve of said second device.

16. The tire changer apparatus according to claim 4, wherein the brake comprises:
a disc fit on the first or second bar, and
a gripper configured to act on the disc to block the rotation thereof and thus block the rotation of the bar on which said disc is fit.

17. A tire changer apparatus for mounting and/or dismounting of a tire from a rim of a wheel of a vehicle, said tire changer apparatus comprising:
a base,
a wheel-holder engaged with the base and configured to put in rotation, around a rotation axis, a wheel of a vehicle,
a frame comprising a first and second column emerging from the base along a direction parallel to the rotation axis,
a first device comprising:
an arm carried by the first column, wherein said arm of the first device extends between a front portion directed towards the rotation axis and an opposite rear portion, wherein said arm of the first device is configured to move at least said front portion relative to the wheel-holder to vary a distance between said front portion of the arm of the first device and the rotation axis, and
a tool terminally carried by said arm at the front portion and configured to operate on at least one of a rim and a tire of a wheel carried by the wheel-holder,
a second device comprising:
an arm carried by the second column, wherein said arm of the second device extends between a front portion directed towards the rotation axis and an opposite rear portion, wherein said arm of the second device is configured to move at least said front portion relative to the wheel-holder to vary a distance between said front portion of the arm of the second device and the rotation axis, and
a tool terminally carried by said arm of the second device at the front portion and configured to operate on at least one of a rim and a tire of a wheel carried by the wheel-holder, and
a first bar configured to rotate around an axis parallel to the rotation axis, said first bar being connected at least with the front portion of the arm of the first device,
wherein the first and the second columns are opposite each other with respect to an ideal middle plane of the tire changer apparatus parallel to the rotation axis, wherein said tool of the second device is opposite the tool of the first device with respect to the ideal middle plane of the tire changer apparatus,
wherein the tire changer apparatus further comprises:

a second bar configured to rotate around a respective axis parallel to the rotation axis, said second bar being connected at least to the front portion of the arm of the second device, and
a transmission which connects the first and the second bar to synchronize the movement of the front portions of the first and second devices,
wherein the arm of the first device comprises:
a sleeve having a seat, and
a stem slidably engaged within the seat of the sleeve, wherein the stem defines the rear and the front portions of said arm of the first device, wherein the tool of the first device is carried by said stem,
wherein the first bar is connected with the stem of the arm of the first device such that a rotation of said first bar corresponds to a movement of said stem, wherein the tire changer apparatus comprises a first wheel fit on the first bar and integral in rotation with the latter, wherein said first wheel is configured to connect the first bar with the stem of the arm of the first device,
wherein the arm of the second device comprises:
a sleeve having a seat, and
a stem slidably engaged within the seat of said sleeve, wherein the stem of the second device defines the rear portion and the front portion of said arm of the second device, wherein the tool of the second device is carried by said stem of the same second device,
wherein the second bar is connected with the stem of the arm of the second device such that a rotation of said second bar corresponds to a movement of said stem of the same second device, and
wherein the tire changer apparatus comprises a second wheel rotationally fixed to the second bar, wherein said second wheel is configured to connect the second bar with the stem of the arm of the second device.

18. The tire changer apparatus according to claim 17 comprising a single translation actuator directly active on the stem of the second device to slidably move said stem within the seat of the sleeve of said second device.

19. A tire changer apparatus for mounting and/or dismounting of a tire from a rim of a wheel of a vehicle, said tire changer apparatus comprising:
a base,
a wheel-holder engaged with the base and configured to put in rotation, around a rotation axis, a wheel of a vehicle,
a frame comprising a first and second column emerging from the base along a direction parallel to the rotation axis,
a first device comprising:
an arm carried by the first column, wherein said arm of the first device extends between a front portion directed towards the rotation axis and an opposite rear portion, wherein said arm of the first device is configured to move at least said front portion relative to the wheel-holder to vary a distance between said front portion of the arm of the first device and the rotation axis, and
a tool terminally carried by said arm at the front portion and configured to operate on at least one of a rim and a tire of a wheel carried by the wheel-holder,
a second device comprising:
an arm carried by the second column, wherein said arm of the second device extends between a front portion directed towards the rotation axis and an opposite rear portion, wherein said arm of the second device is configured to move at least said front portion relative to the wheel-holder to vary a distance between said front portion of the arm of the second device and the rotation axis, and a tool terminally carried by said arm of the second device at the front portion and configured to operate on at least one of a rim and a tire of a wheel carried by the wheel-holder, and a first bar configured to rotate around an axis parallel to the rotation axis, said first bar being connected at least with the front portion of the arm of the first device, wherein the first and the second columns are opposite each other with respect to an ideal middle plane of the tire changer apparatus parallel to the rotation axis, wherein said tool of the second device is opposite the tool of the first device with respect to the ideal middle plane of the tire changer apparatus, wherein the tire changer apparatus further comprises:

a second bar configured to rotate around a respective axis parallel to the rotation axis, said second bar being connected at least to the front portion of the arm of the second device, and a transmission which connects the first and the second bar to synchronize the movement of the front portions of the first and second devices, wherein the arm of the first device extends along an extension direction lying on a plane orthogonal to the rotation axis, and wherein the arm of the second device extends along a predetermined extension direction lying on a plane orthogonal to the rotation axis, wherein the tilt of the arms, respectively of the first and second devices, is fixed with respect to the ideal middle plane.

20. The tire changer apparatus according to claim 19, wherein the extension direction of the arm of the first device is tilted with respect to the ideal middle plane by an angle comprised between 10° and 30°, and wherein the extension direction of the arm of the second device is tilted with respect to the ideal middle plane by an angle comprised between 10° and 30°.

21. A tire changer apparatus for mounting and/or dismounting of a tire from a rim of a wheel of a vehicle, said tire changer apparatus comprising:

a base, a wheel-holder engaged with the base and configured to put in rotation, around a rotation axis, a wheel of a vehicle, a frame comprising a first and second column emerging from the base along a direction parallel to the rotation axis, a first device comprising:

an arm carried by the first column, wherein said arm of the first device extends between a front portion directed towards the rotation axis and an opposite rear portion, wherein said arm of the first device is configured to move at least said front portion relative to the wheel-holder to vary a distance between said front portion of the arm of the first device and the rotation axis, and a tool terminally carried by said arm at the front portion and configured to operate on at least one of a rim and a tire of a wheel carried by the wheel-holder, a second device comprising:

an arm carried by the second column, wherein said arm of the second device extends between a front portion directed towards the rotation axis and an opposite rear portion, wherein said arm of the second device is configured to move at least said front portion relative to the wheel-holder to vary a distance between said front portion of the arm of the second device and the rotation axis, and a tool terminally carried by said arm of the second device at the front portion and configured to operate on at least one of a rim and a tire of a wheel carried by the wheel-holder, and a first bar configured to rotate around an axis parallel to the rotation axis, said first bar being connected at least with the front portion of the arm of the first device, wherein the first and the second columns are opposite each other with respect to an ideal middle plane of the tire changer apparatus parallel to the rotation axis, wherein said tool of the second device is opposite the tool of the first device with respect to the ideal middle plane of the tire changer apparatus, wherein the tire changer apparatus further comprises:

a second bar configured to rotate around a respective axis parallel to the rotation axis, said second bar being connected at least to the front portion of the arm of the second device, and a transmission which connects the first and the second bar to synchronize the movement of the front portions of the first and second devices, wherein the frame comprises, at a top portion opposite the base, a support plate which engages the transmission, wherein the transmission is opposite the first and second devices with respect to the support plate of the frame.

* * * * *